(12) United States Patent
Kim

(10) Patent No.: US 9,990,877 B2
(45) Date of Patent: Jun. 5, 2018

(54) SELF-DIAGNOSING SYSTEM AND METHOD OF SELF-DIAGNOSING OF A DISPLAY DEVICE

(71) Applicant: LG ELECTRONICS INC., Seoul (KR)

(72) Inventor: Yongwoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 108 days.

(21) Appl. No.: 14/830,088

(22) Filed: Aug. 19, 2015

(65) Prior Publication Data

US 2016/0055778 A1 Feb. 25, 2016

(30) Foreign Application Priority Data

Aug. 22, 2014 (KR) .......................... 10-2014-0109811

(51) Int. Cl.
*G09G 1/28* (2006.01)
*G09G 3/20* (2006.01)
*H04N 17/04* (2006.01)

(52) U.S. Cl.
CPC ......... *G09G 3/2003* (2013.01); *H04N 17/045* (2013.01); *G09G 2330/12* (2013.01); *G09G 2360/145* (2013.01)

(58) Field of Classification Search
None
See application file for complete search history.

(56) References Cited

U.S. PATENT DOCUMENTS

| | | | |
|---|---|---|---|
| 2009/0087090 A1 | 4/2009 | Gregory, Jr. | |
| 2011/0050906 A1* | 3/2011 | Su ........................ | H04N 17/02 348/179 |

(Continued)

FOREIGN PATENT DOCUMENTS

| | | | | |
|---|---|---|---|---|
| JP | 2008-216334 A | * | 9/2008 | ............... G09F 9/00 |
| JP | 2008-216334 A | | 9/2008 | |
| KR | 10-2011-0011930 A | | 2/2011 | |

(Continued)

*Primary Examiner* — Weiming He
(74) *Attorney, Agent, or Firm* — Birch, Stewart, Kolasch & Birch, LLP

(57) ABSTRACT

This disclosure discloses a self-diagnosing system and a method of self-diagnosing of a display device. A display device performing self-diagnosis by communicating with a server according to an exemplary embodiment of the present invention includes an outputting unit configured to output content on a screen and to output On Screen Display (OSD) data respective to each color of RGB to a predetermined area therein, a controlling unit configured to transmit a sensing command directing an initiation of self-diagnosis to a sensor attached to an area of the display device, to acquire sensing data respective to each color in accordance with the sensing command transmission from the sensor, to compare the acquired sensing data respective to each color with the outputted OSD data respective to each color, and to generate self-diagnosis result data respective to the screen based upon the compared result and transmitting the generated data to a server, and a transmitting unit configured to transmit the generated self-diagnosis data in accordance with the control of the controlling unit.

16 Claims, 15 Drawing Sheets

(56) References Cited

U.S. PATENT DOCUMENTS

2014/0009486 A1   1/2014  Matsui
2014/0354697 A1*  12/2014 Endisch ................. H04N 17/02
                                                    345/690

FOREIGN PATENT DOCUMENTS

KR      10-2013-0064953 A      6/2013
KR         20130064953 A  *   6/2013   .............. G06F 11/22

* cited by examiner

FIG. 5
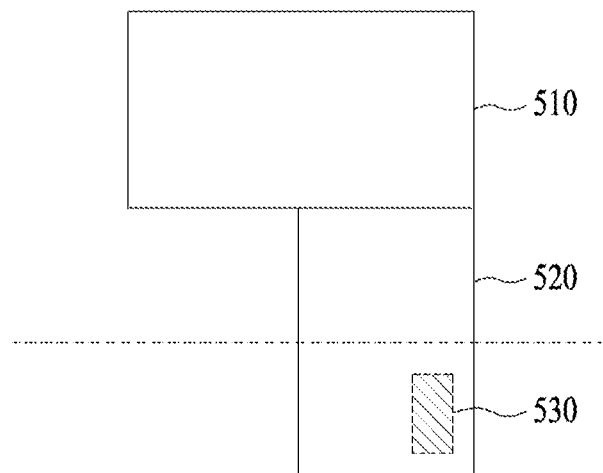
(a)
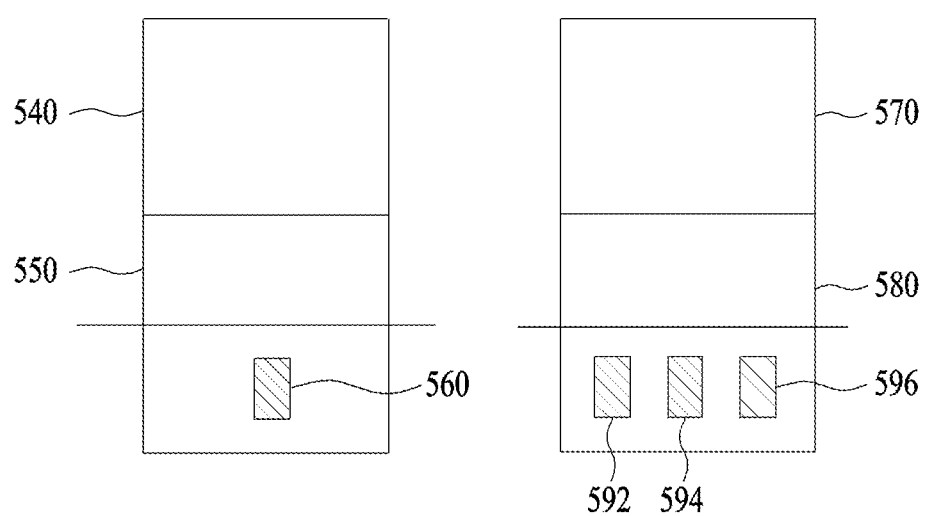
(b)　　　　　　　(c)

| Status check(Command: s v) | |
|---|---|
| Transmission [s][v][ ][Set ID][ ][Data][ ][FF][Cr] If the Data is 0x10: Check Screen | |
| Acknowledgement [v][ ][Set ID][ ][OK][Data][Data1][x] | |
| Data1 | 00: RGB ALL NG<br>01: R(OK) G(NG) B(NG)<br>02: R(NG) G(OK) B(NG)<br>03: R(NG) G(NG) B(OK)<br>04: R(OK) G(OK) B(NG)<br>05: R(OK) G(NG) B(OK)<br>06: R(NG) G(OK) B(OK)<br>07: RGB ALL OK<br>08: Reserved |

FIG. 11
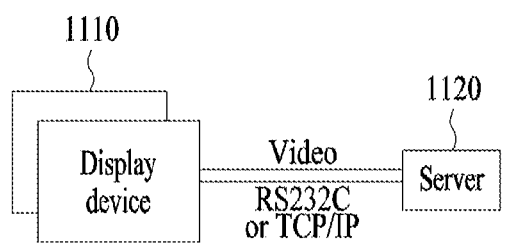
(a)
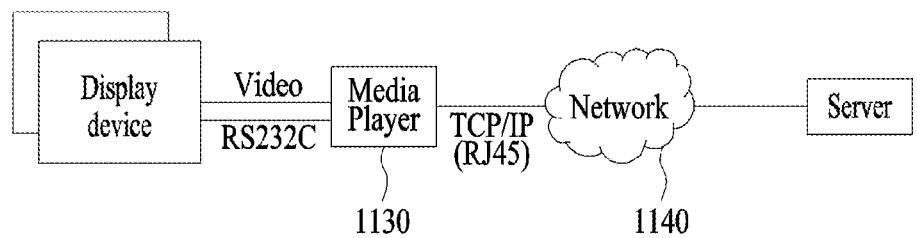
(b)

FIG. 13

Diagnostics

● Host Information — 1310

Model Name : GLONAL-PLAT2
MOdel Option : 0x0E

● Memory — 1320

FLASH : 131072 KB
DRAM : 262144 KB
NVM : 128 KB

● Host Release Version — 1330

Firmware Version(App history ver.) : 3.21.01.01(5619)
Micom Version : V1.13.5
Event / Board Type : MP / MP 1ST
Compile Date / Time : 20130803 / 14:00:57
Compile User : yongwoo77.kim ● TVLINK information — 1340

Baudrate : 9600 BPS
Debug Status : RELEASE
Set ID / Total Set ID : 1/255

● Used Time — 1350

Used Time : 77    ● Fan Status — 1310
Current Temperature : 48 Degree Celsius
Fan Fault Alram : N/A
BACKLIGHT Module is : Normal
Check Screen : OK — 1365
● MAC Address — 1370
MAC Address : 00:E0:91:C6:C0:CB
● DVI/HDMI Status — 1380
Can't display this information now ⊙● Exit

SELF-DIAGNOSING SYSTEM AND METHOD OF SELF-DIAGNOSING OF A DISPLAY DEVICE

Pursuant to 35 U.S.C. § 119(a), this application claims the benefit of the Korean Patent Application No. 10-2014-0109811, filed on Aug. 22, 2014, which is hereby incorporated by reference as if fully set forth herein.

BACKGROUND OF THE INVENTION

Field of the Invention

The present invention relates to a self-diagnosing system and, more particularly, to details on a display device within the self-diagnosing system performing self-diagnosis by using an RGB sensor and processing the self-diagnosis by communicating with a server.

Discussion of the Related Art

In places where diverse information is required to be delivered to a multitude of people, such as supermarkets, department stores, airports, and so on, there are limitations in using only paper-printed advertisements or notices or mechanical displays. And, therefore, in response to the inconvenience of many users, digital signage has been extensively installed. Such digital signage is being appraised for its advantages in seeking diversity in the information in accordance with the evolution in the digital technology, in quickly processing information, thereby being capable of delivering diverse information to a large number of people more conveniently and quickly as compared to the related art.

However, due to such method of managing multiple sets of digital signage, which are installed by being dispersed throughout a broad area, by using a management pc being located at a remote location, such method of delivering information may cause the digital signage to be exposed to the outside environment, which may lead to a breakdown (or failure) depending upon the environment. Moreover, in the above-described system, it is difficult to consistently manage one set of digital signage, and, even if a specific set of digital signage is damaged (or broken or out of order), it is difficult to recognize (or be aware of) such breakdown in real-time. And, therefore, it is difficult to immediately respond to or handle such breakdown. Meanwhile, in the related art, unless a managing operator (or manager) personally verifies the breakdown, since it is difficult to easily verify a level or type of the breakdown, this may cause degradation in system management efficiency even if the breakdown merely corresponds to a minor failure (or damage). Additionally, due to such minor failure, since advertisement cannot be delivered through the digital signage, this may lead to financial loss of advertisers. Furthermore, if a breakdown (or failure) in the digital signage are not fixed (or repaired) immediately, when an emergency situation occurs in an area being crowded with a large number of people, urgent messages may not be delivered properly, which may become the cause of a major disaster.

SUMMARY OF THE INVENTION

Accordingly, the present invention is directed to Self-diagnosing system and method of self-diagnosing of a display device that substantially obviate one or more problems due to limitations and disadvantages of the related art.

In order to resolve this problem, an object of the present invention is to provide a self-diagnosing system that can self-diagnose a presence or absence of any breakdown (or failure) in a display device and a quality of the display device by using an RGB sensor and that can process the self-diagnosis result by communicating with a remote server.

Another object of the present invention is to attach an RGB sensor to a predetermined area of the display device, and to perform self-diagnosis on a presence or absence of a panel failure, a cable defect, and so on, in the display device in comparison to a measured RGB value.

Yet another object of the present invention is to allow monitoring to be performed by the remote server, so that, when an error occurs during playback (or reproduction) of content in the display device, the error can be immediately recognized and processed (or handled), thereby minimizing user inconvenience.

Yet another object of the present invention is to allow a self-diagnosis on a presence or absence of a malfunction (or error) in the panel to be performed regardless of a presence or absence of a signal from the display device.

Yet another object of the present invention is to allow an examination area and an examination location, and so on, for performing the self-diagnosis to be arbitrarily adjusted by using a software coding method in order to perform self-diagnosis of the display device.

A further object of the present invention is to allow self-diagnosis and additional processing respective to the self-diagnosis to be carried out in the display device, while providing conventional (or already-existing) content or application at the same time.

The technical objects of the present invention will not be limited only to the objects described above, and any other additional technical objects that have not been mentioned in the description will become apparent to those having ordinary skills in the art upon the following description of the present application.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device performing self-diagnosis by communicating with a server includes an outputting unit configured to output content on a screen and to output On Screen Display (OSD) data respective to each color of RGB to a predetermined area therein, a controlling unit configured to transmit a sensing command directing an initiation of self-diagnosis to a sensor attached to an area of the display device, to acquire sensing data respective to each color in accordance with the sensing command transmission from the sensor, to compare the acquired sensing data respective to each color with the outputted OSD data respective to each color, and to generate self-diagnosis result data respective to the screen based upon the compared result and transmitting the generated data to a server, and a transmitting unit configured to transmit the generated self-diagnosis data in accordance with the control of the controlling unit.

In another aspect of the present invention, a method of self-diagnosing a display device includes outputting content of a screen, outputting On Screen Display (OSD) data respective to each color of RGB to the screen having the content outputted thereto, transmitting a sensing command directing an initiation of self-diagnosis to a sensor attached to an area of the display device; acquiring sensing data respective to each color in accordance with the sensing command transmission from the sensor, comparing the acquired sensing data respective to each color with the outputted OSD data respective to each color, and generating self-diagnosis result data respective to the screen based upon the compared result and transmitting the generated data to a server.

Accordingly, the present invention provides the following effects and/or features.

First of all, a self-diagnosing system that can self-diagnose a presence or absence of any breakdown (or failure) in a display device and a quality of the display device by using an RGB sensor and that can process the self-diagnosis result by communicating with a remote server may be provided.

Secondly, by attaching a compact RGB sensor to a predetermined area of the display device, a self-diagnosis on a presence or absence of a panel failure, a cable defect, and so on, may be performed in the display device in comparison to a measured RGB value.

Thirdly, by allowing monitoring to be performed by the remote server, so that, when an error occurs during playback (or reproduction) of content in the display device, the error may be immediately recognized and processed (or handled), thereby minimizing user inconvenience.

Fourthly, a self-diagnosis may be performed on a presence or absence of a malfunction (or error) in the panel regardless of a presence or absence of a signal from the display device.

Fifthly, an examination area and an examination location, and so on, for performing the self-diagnosis may be arbitrarily adjusted by using a software coding method in order to perform self-diagnosis of the display device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 illustrates an RGB sensor unit that is realized according to an exemplary embodiment of the present invention;

FIG. 9 illustrates definitions of data being transmitted/received during the self-diagnosis procedure;

FIG. 11 illustrates a network environment for data communication between a display device and a server according to an exemplary embodiment of the present invention;

FIG. 13 to FIG. 15 respectively illustrate examples of outputting self-diagnosis results and processing such results according to an exemplary embodiment of the present invention.

DETAILED DESCRIPTION OF THE INVENTION

Figure 1:
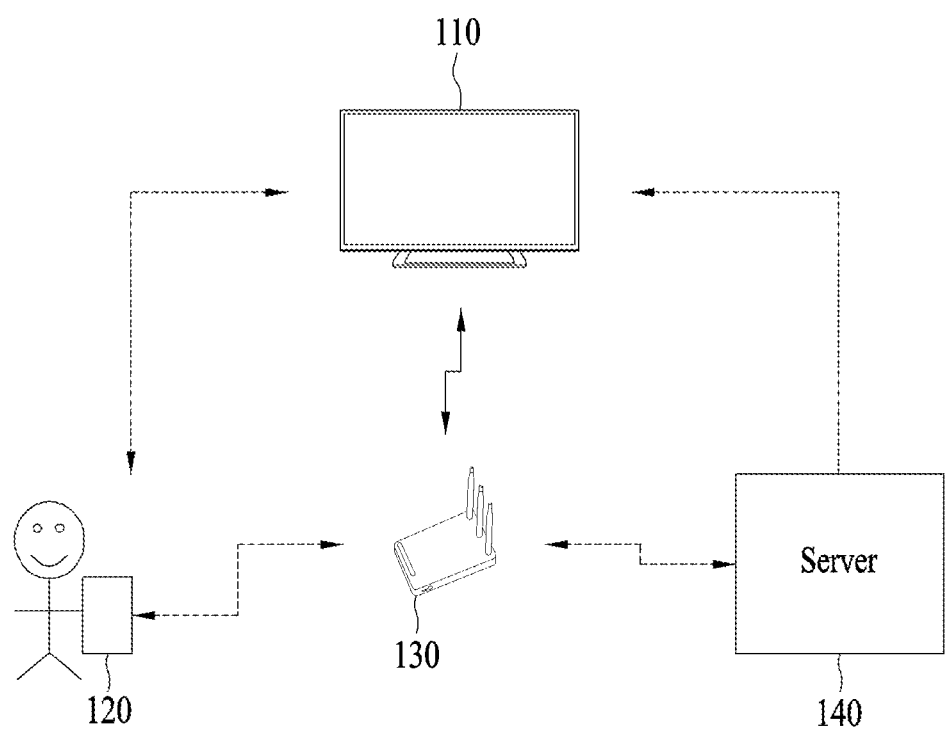
FIG. 1 illustrates a general view of a self-diagnosis system including a display device according to an exemplary embodiment of the present invention.

Hereinafter, diverse embodiment(s) of a self-diagnosis system and a screen self-diagnosis method in a display device according to the present invention will be described in detail with reference to the accompanying drawings.

The suffixes "module", "unit", and so on, respective to the elements used in this disclosure are merely used for the purpose of simplifying the description of the present invention, and, therefore, whenever required, both terms may be alternately used. Additionally, in case of using reference numerals, such as "first", "second", and so on, instead of signifying the order itself, such terms are merely used for simplicity in describing the corresponding terms, and, therefore, the present invention will not be limited only to such terms or reference numerals.

Additionally, general terms that are currently most broadly used have been used based upon the functions according to the technical scope and spirit of the present invention. However, such terms may be varied in accordance with the intentions of anyone skilled in the art, general practice, or an advent of a new technology. Additionally, in some specific cases, some of the terms used herein have been arbitrarily selected by the applicant, and, in this case, the significance of such terms will be described in detail in the corresponding part of the detailed description. Accordingly, the corresponding terms should not be understood by the term itself, and should be interpreted based upon the overall context of a phrase, sentence, or paragraph of the disclosure.

Meanwhile, the content described in this disclosure and/or the drawings will not be limited only to the preferred exemplary embodiment of the present invention, and it will be apparent that the scope and spirit of the present invention shall be decided by the appended claims of this disclosure.

The present invention will hereinafter be described in more detail with reference to the accompanying drawings.

FIG. 1 illustrates a general view of a self-diagnosis system including a display device according to an exemplary embodiment of the present invention.

According to the present invention, a display device performing self-diagnosis by communicating with a server includes an outputting unit configured to output content on a screen and to output On Screen Display (OSD) data respective to each color of RGB to a predetermined area therein, a controlling unit configured to transmit a sensing command directing an initiation of self-diagnosis to a sensor attached to an area of the display device, to acquire sensing data respective to each color in accordance with the sensing command transmission from the sensor, to compare the acquired sensing data respective to each color with the outputted OSD data respective to each color, and to generate self-diagnosis result data respective to the screen based upon the compared result and transmitting the generated data to a server, and a transmitting unit configured to transmit the generated self-diagnosis data in accordance with the control of the controlling unit.

Here, the controlling unit sequentially performs determination by comparison in each of the acquired colors units. And, the controlling unit determines by comparison whether a color data value sensed with respect to the corresponding color, when outputting OSD data respective to each color, is greater than OSD data values respective to other colors. Based upon the compared result, when the color data value sensed with respect to the corresponding color is equal to or less than OSD data values respective to other colors, the controlling unit determines whether or not an error count respective to the corresponding color exceeds a predetermined threshold value. Based upon the determined result, when the error count respective to the corresponding color exceeds the predetermined threshold value, the controlling unit determines a self-diagnosis result respective to the corresponding color to be false. Based upon the determined result, when the error count respective to the corresponding color does not exceed the predetermined threshold value, the controlling unit determines by comparison whether a color data value sensed with respect to a next color is greater than OSD values respective to other colors. Based upon the compared result, when the color data value sensed with respect to the corresponding color is greater than OSD data values respective to other colors, the controlling unit initializes an error count respective to the corresponding color and determines the self-diagnosis result to be true. The controlling unit performs control operations so as to allow the generated self-diagnosis data to transmit data indicating that the self-diagnosis result is true to the server, only when the self-diagnosis result respective to all colors are determined to be true. The controlling unit performs control operations so as to allow re-sensing to be performed with respect to all colors or to be performed with respect to the corresponding color based upon the sequential self-diagnosis results respective to each color. The controlling unit performs control operations so as to allow re-sensing to be performed for a predetermined number of times until results respective to all colors are determined to be true, and to allow the self-diagnosis result to be transmitted to the server as being false, only when results respective to all colors are not all determined to be true during the predetermined number of times.

Referring to FIG. 1, the self-diagnosis system according to the present invention is broadly configured of a display device (110) and a server (140). Herein, the self-diagnosis system may further include at least one of a user equipment (120) capable of performing data communication with the display device (110) and the server (140), and a relay or gateway (130) being configured to support data communication between the display device (110), the user equipment (120), and/or the server (140).

For example, the display device (110) as set forth herein may be any device that can handle any one of transmitting, receiving, handling and outputting data, content, servicer, application, and so forth with the user equipment (120) and/or the server (140). The display device (110) may be connected to other digital or display devices through wired network or wireless network, paired or connected to external server, and through the connections, the display device (110) may transmit and receive the prescribed data. Examples of the display device (110) may include standing devices such as a digital signage, a network TV, a Hybrid Broadcast Broadband TV (HBBTV), a smart TV, Internet Protocol TV (IPTV), or personal computer (PC), or mobile/handheld devices such as a Personal Digital Assistant (PDA), a smart phone, a tablet PC, a wearable device including a smart watch or smart glasses or a Notebook computer. Moreover, the wired or wireless network described in this disclosure may refer to various pairing method, standard telecommunication network protocol methods supported for transmitting and receiving data between digital devices or between digital device and external server. The wired or wireless network also includes various telecommunication network protocols supported now as well as in the future. Examples of the wired or wireless network include wired network supported by various telecommunication standard such as Universal Serial Bus (USB), Composite Video Banking Sync (CVBS), Component, S-Video (analog), Digital Visual Interface (DVI), High Definition Multimedia Interface (HDMI), RGB, D-SUB and so forth, and wireless network supported by various standards including Bluetooth, Radio Frequency Identification (RFID), infrared Data Association (IrDA), Ultra Wideband (UWB), ZigBee, Digital Living Network Alliance (DLNA), Wireless LAN (WLAN)(Wi-Fi), Wireless broadband (Wibro), World Interoperability for Microwave Access (Wimax), High Speed Downlink Packet (HSDPA), Long Term Evolution/LTE-Advanced (LTE/LTE-A), Wi-Fi direct, and so forth.

Meanwhile, the display device (110) may perform intelligent functions such as receiving broadcasting program, operating computer functions, and supporting at least one external input, and by being connected through the network wired or wirelessly. The display device (110) may support e-mail functions, web browsing functions, banking, gaming, and executing applications. The display device (110) may further include an interface for any one of input or control means supporting handwriting input, touch-screen, and space remote control. Furthermore, the display device (110) may use a standard operating system (OS), however, the digital device described in this specification and the embodiments, uses a Web OS. Therefore, the digital device may perform functions such as adding, deleting, amending, and updating the various services and applications for standard universal OS kernel or Linux kernel in order to construct a more user-friendly environment. When the display device (110), described above, receives and handles external input, the external input includes external input devices described above, meaning all input means or digital devices, capable of transmitting and receiving data through wired or wireless network connected to and from the digital device. For example, the external input includes HDMI, game devices such as a Playstation or an X-Box, a smart phone, a tablet PC, a printing device such as a pocket photo, digital devices such as a smart TV and a blue-ray device.

The display device (110) may correspond to one set including up to a STB (Set-top Box). However, hereinafter, in this disclosure, in describing the display device (110), the digital signage, signage or monitor will be described as the exemplary embodiments for simplicity. Nevertheless, the technical spirit of the present invention will not be limited only to the digital signage, and, therefore, it will be apparent that the present invention may also be applied to the above-described fixed device and mobile device by using the same method or a similar method.

The display device (110) receives content, application, and so on, being transmitted from a source and outputs the received content, application, and so on, on a screen. Herein, in addition to the user equipment (120), the relay (130), and the server (140), other external sensors may also be included in the source. Meanwhile, the content may include broadcast content, web content, commercial data or advertising data, emergency alert message, guide data, and so on, and such content may be provided in forms of audio, video, text, image, and so on. The display device (110) may support an OS platform that is identical to that of the server (140), and, herein, a web OS may be given as an example of the OS platform. Meanwhile, the display device (110) may also be operated in an OS platform that is different from that of the server (140) or that of the user equipment (120). Moreover, the display device (110) may also support a plurality of OS platforms.

The server (140), referred to as in this disclosure, includes digital device or system capable of transmitting and receiving data to and from client that is, the display device (110), and may also be referred to as a processor. For example, the server (140) may be servers providing services such as a portal server providing web page, a web content or a web service, an advertising server providing advertising data, a content server, a Social Network Service (SNS) server providing an SNS service, a service server providing a service to a manufacturer, a Multichannel Video Programming Distributor (MVPD) providing a Video on Demand (VOD) or a streaming service, and a service server providing pay services. At this point, the server (140) may handle all control, such as content play, content stop, and so on, within the display device (110). Meanwhile, according to the present invention, the server (140) may receive self-diagnosis result data of one or more display devices that are connected thereto. Additionally, the server (140) may directly control devices from a remote location based upon the received self-diagnosis result data, or the server (140) may transmit the self-diagnosis result data and reference data and control data, and so on, based upon the self-diagnosis result data to a managing operator located near a problem-detected display device or to a user equipment of the managing operator, so as to provide support in order to allow the managing operator to perform operations corresponding to the self-diagnosis result on the respective display device. As described above, the user equipment of the managing operator may correspond to the user equipment (120) shown in FIG. 1. The server (140) may be equipped with an OS platform that is available for support in the display device (110), and, herein, for example, the OS platform may correspond to a web OS.

As described above, the user equipment (120) collectively refers to a device that can perform data communication with the display device (110), and the user equipment (120) may correspond to a wearable device, such as a PDA (Personal Digital Assistant), a Smart Phone, a Tablet PC, a Notebook, a smart watch or smart glasses, and so on. The user equipment (120) may control the display device (110) via data communication. Meanwhile, the user equipment (120) may control the display device (110) through a specific application. At this point, the specific application may correspond to an embedded application including a program or source code for performing control, or the specific application may correspond to a basic application. Herein, the user equipment (120) may correspond to at least one of a smart phone, a wearable device, a tablet pc, the display device specific control device, and so on. Additionally, the user equipment (120) may perform communication with the server (140), and the user equipment (120) may also receive self-diagnosis result data of the display device (110) from the server (140) and may then output the received data on the screen of the user equipment. Moreover, in addition to the self-diagnosis result, the user equipment (120) may also receive and process directions, manuals, and so on, respective to the operations corresponding to the above-described result. Furthermore, in order to perform data communication with at least one of the display device (110) and the server (140), the user equipment (120) may support a web OS platform, and the data communication may be carried out through a web application, which supports the web OS platform. In order to process such data associated with the display device self-diagnosis, the user equipment (140) may download an associated web application and may use the downloaded web application by installing the application.

The relay (130) supports a communication protocol so as to allow data communication to be carried out smoothly between the display device (110), the user equipment (120), the server (140), an external server, and so on, and, whenever required, the relay (130) may also perform varied processing.

Figure 2:
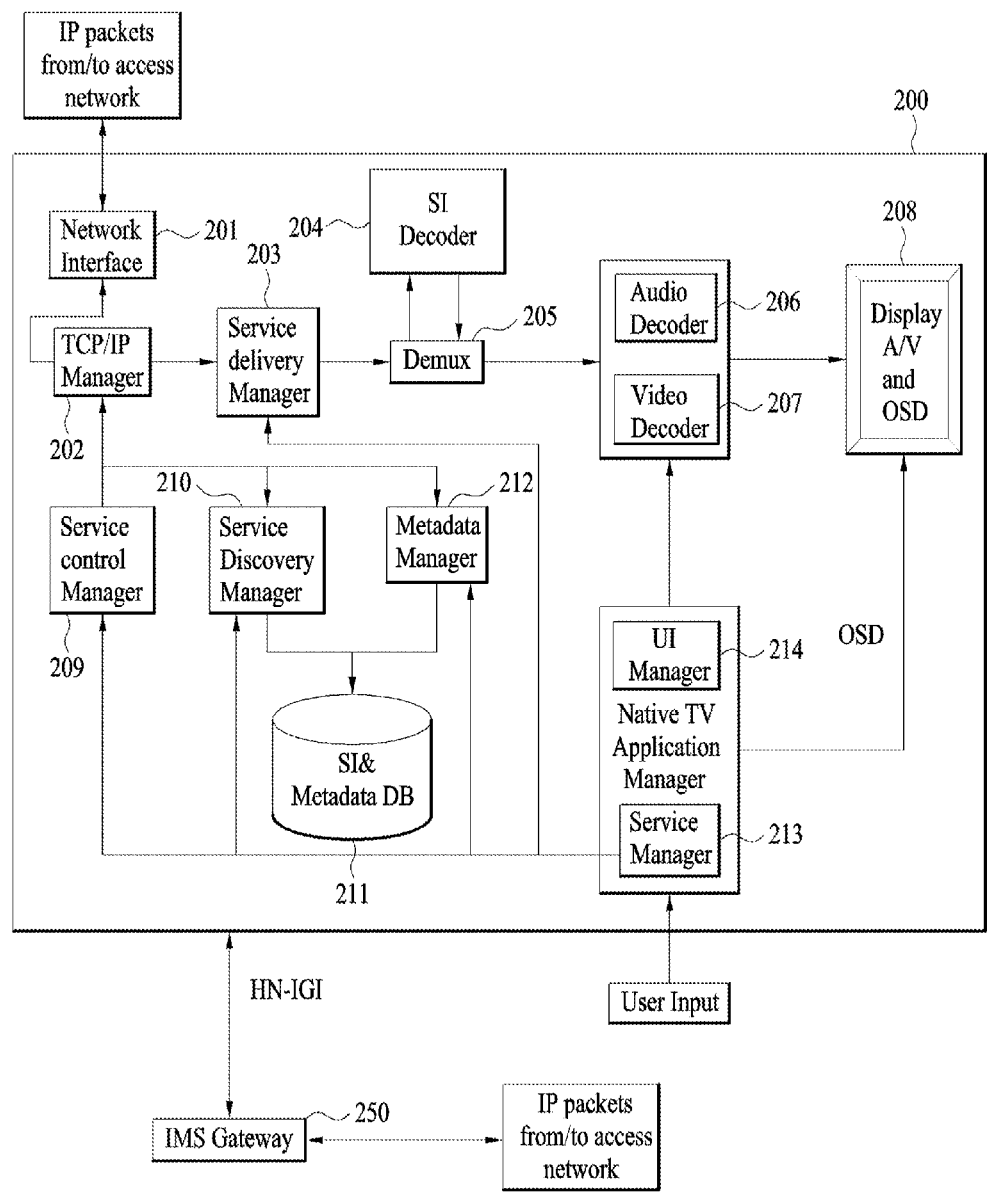
FIG. 2 illustrates a structural block view of a display device according to an exemplary embodiment of the present invention.

FIG. 2 illustrates a structural block view of a display device according to an exemplary embodiment of the present invention.

Hereinafter, the display device that is described in this disclosure corresponds to the above-described display device (110) shown in FIG. 1.

The display device 200 can include a network interface 201, a TCP/IP (Transfer Control Protocol/Internet Protocol) manager 202, a service delivery manager 203, an SI (System Information, Service Information or Signaling Information) decoder 204, a demultiplexer 205, an audio decoder 206, a video decoder 207, a display A/V (Audio/Video) and OSD (On Screen Display) module 208, a service control manager 209, a service discovery manager 210, a SI & metadata database (DB) 211, a metadata manager 212, a service manage 213, a UI (User Interface) manager 214, etc. Meanwhile, when the display device (200) is performed as only digital signage, some elements may be implemented from the above-described elements in the display device (220). In this case, other elements from the above-described elements may be implemented on the server (140), process necessary data, and transmit the processed necessary data to the display device (140). Also, the display device (200) may receive content from the server (140) or another server directly as downloading or streaming method, and output the received content on a screen.

The network interface 201 can receive or transmit IP (Internet Protocol) packets or IP datagrams (hereinafter, referred as IP packets) through a network accessed. As an example, the network interface 201 can receive service, application, content, etc., from the server (140) or another external server of FIG. 1 through the network.

The TCP/IP manager 202 is involved in packet delivery of IP packets transmitted to the digital device 200 and IP packets transmitted from the digital device 200 between a source and a destination. The TCP/IP manager 202 may classify received packets according to an appropriate protocol and output the classified packets to the service delivery manager 205, the service discovery manager 210, the service control manager 209, and the metadata manager 212, etc.

The service delivery manager 203 can control received service data. For example, the service delivery manager 203 can use Real-Time Protocol/Real-Time Control Protocol (RTP/RTCP) to control real-time streaming data. If the real-time streaming data is transmitted using the RTP, the service delivery manager 203 can parse a received real-time streaming data packet, transmitted based on the RTP, and transmits the parsed data packet to the demultiplexer 205 or store the parsed data packet in the SI & metadata DB 211 under the control of the service manager 213. The service delivery manager 203 can provide feedback of the network reception information to the server based on the RTCP.

The demultiplexer 205 can demultiplex audio data, video data, SI data from a received packet and transmit the demultiplexed data to each of the audio/video decoder 206/207 and the SI decoder 204.

The SI decoder 204 can decode the demultiplexed SI data such as program specific information (PSI), program and system information protocol (PSIP), digital video broadcast-service information (DVB-SI), digital television terrestrial multimedia broadcasting/coding mobile multimedia broadcasting (DTMB/CMMB), etc. The SI decoder 204 can store the decoded SI data in the SI & metadata DB 211. The SI data stored in the SI & metadata DB 211 can be read and extracted by a component which requires the SI data according to user request, for example.

The audio decoder 206 and the video decoder 207 can decode the demultiplexed audio and video data, respectively. The decoded audio data and video data can be provided to the user through the display unit 208.

The application manager can include the service manager 213 and the UI manager 214, for example. The application manager can perform a function of the controller of the digital device 200. In other words, the application manager can administrate the overall state of the digital receiver 200, provides a UI, and manage other mangers. According to the present invention, when the self-diagnosis result data are collected, the application manager may process the collected data and may then transmit the processed data to the server (140), or the application manager may transmit the collected data in their unprocessed state. Additionally, based upon the collected self-diagnosis result data, in case a problem occurs in the screen, the application manager may also separately output a notification message related to the self-diagnosis result onto the display screen, wherein the outputted notification message corresponds to a message separate from the notification message being transmitted to the server (140). Meanwhile, the notification message may be outputted based upon a control command, which is received from the server (140). Furthermore, the notification message may also be outputted on a predetermined portion of a screen of the content or application, which is currently being provided on the screen.

The UI manager 214 can provide a graphic user interface (GUI)/UI for the user using OSD, etc. And, the UI manager 214 can receive a key input from the user and perform an operation of the device in response to the received key input. For example, the UI manager 214 can transmit a key input signal to the service manager 213 if the key input signal of selecting a channel is received from the user.

The service manager 213 can control service-related managers such as the service delivery manager 203, the service discovery manager 210, the service control manager 209, and the metadata manager 212. The service manager 213 can generate a channel map and control a channel selection using the generated channel map according to the received key input from the UI manager 214. The service manager 213 can receive service information from the SI decoder 204 and set audio/video PID (packet identifier) of a selected channel to the demultiplexer 205. The set audio/video PID can be used for the demultiplexing procedure. Accordingly, the demultiplexer 205 can filter the audio data, video data and SI data using the PID (PID filtering or section filtering.)

The service discovery manager 210 can provide information required to select a service provider that provides a service. Upon receipt of a signal for selecting a channel from the service manager 213, the service discovery manager 210 discovers or searches a service based on the received signal.

The service control manager 209 can select and control a service. For example, the service control manager 209 can use perform service selection and control using IGMP or real time streaming protocol (RTSP) when the user selects a live broadcast service, and using RTSP when the user selects a VOD service. The RTSP can provide a trick mode for the real-time streaming. Also, the service manager 213 can initialized and manage a session through the IMS (IP Multimedia Subsystem) gateway 250 using IMS and SIP (Session Initiation Protocol.) The above protocols are just an example and other protocols can be used depending on an implementation.

The metadata manager 212 can manage metadata regarding services and store metadata in the SI & metadata DB 211.

The SI & metadata DB 211 can store SI data decoded by the SI decoder 204, metadata managed by the metadata manager 212, and information required to select a service provider, which is provided by the service discovery manager 210. In addition, the SI & metadata DB 211 can store system set-up data, etc. The SI & metadata DB 211 can be implemented using a Non-Volatile RAM (NVRAM) or a Flash memory, and the like.

An IMS gateway 250 can be a gateway that collects functions required to access IPTV services based on an IMS.

Figure 3:
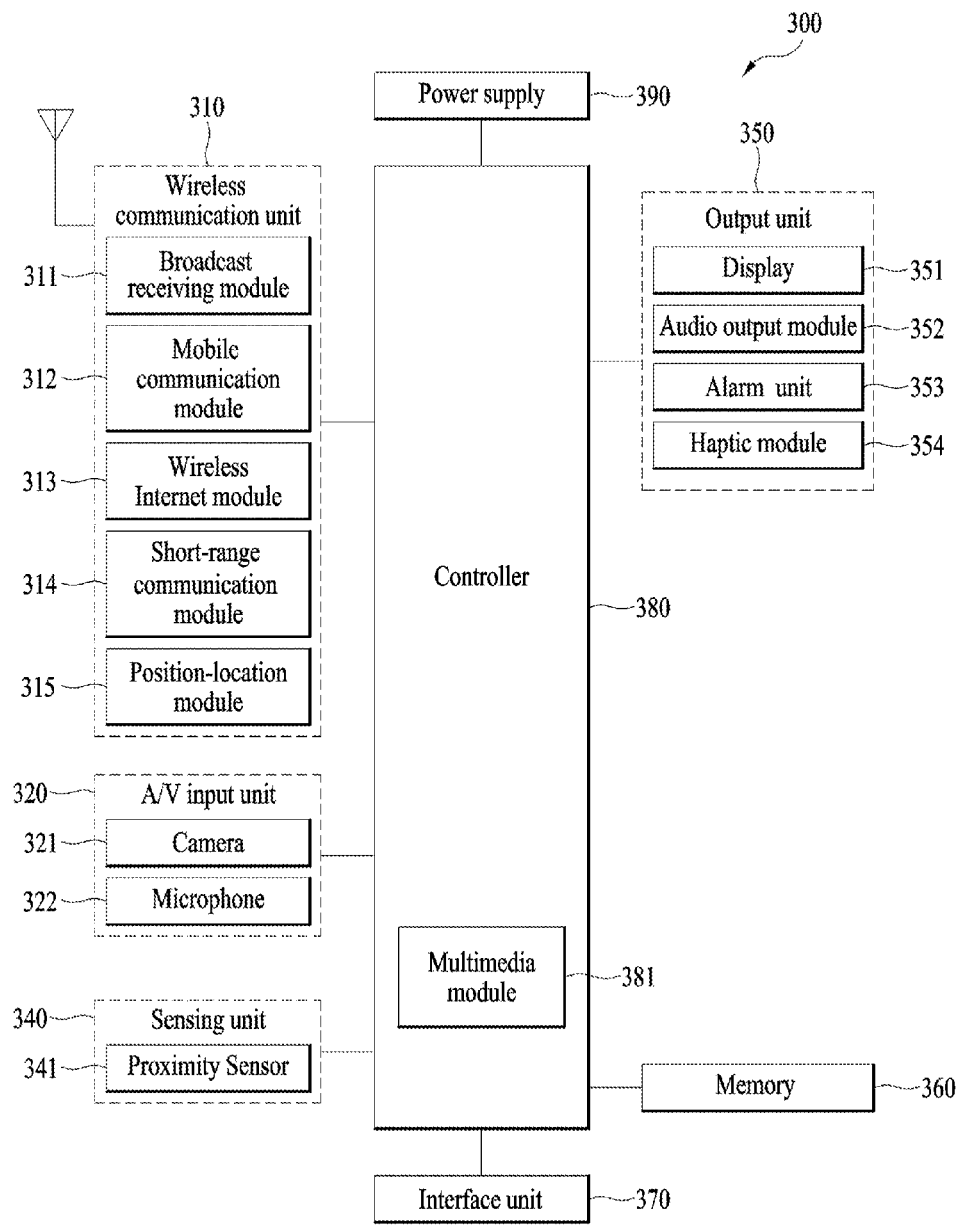
FIG. 3 illustrates a structural block view of a display device according to another exemplary embodiment of the present invention.

FIG. 3 illustrates a structural block view of a display device according to another exemplary embodiment of the present invention.

According to yet another exemplary embodiment of the display device, a mobile device being configured as shown in FIG. 3 may be given as an example. Additionally, FIG. 3 may also correspond to the configuration of the user equipment (120) shown in FIG. 1 instead of the display device. Furthermore, a mobile device may also be realized by including only part of configuration elements and not all of the configuration elements shown in FIG. 3, and, in this case, the remaining configuration elements may be equipped to the server (140).

With reference to FIG. 3, the mobile terminal 300 can include a wireless communication unit 310, an A/V input unit 320, an user input unit 330, a sensing unit 340; an output unit 350, a memory 360, an interface unit 370, a controller 380, and a power supply unit 390.

The wireless communication unit 310 typically includes one or more components which permit wireless communication between the mobile terminal 300 and a wireless communication system or network within which the mobile terminal 300 is located. For instance, the wireless communication unit 310 can include a broadcast receiving module 311, a mobile communication module 312, a wireless Internet module 313, a short-range communication module 314, and a position-location module 315.

The broadcast receiving module 311 receives a broadcast signal and/or broadcast associated information from an external broadcast managing server via a broadcast channel. The broadcast channel may include a satellite channel and a terrestrial channel. At least two broadcast receiving modules 311 can be provided in the mobile terminal 300 to facilitate simultaneous reception of at least two broadcast channels or broadcast channel switching. The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 312. The broadcast associated information can be implemented in various forms. For instance, broadcast associated information may include an electronic program guide (EPG) and an electronic service guide (ESG). The broadcast receiving module 311 may be configured to receive broadcast signals transmitted from various types of broadcast systems. By non-limiting example, such broadcasting systems may include digital video broadcasting-Terrestrial (DVB-T), DVB-Satellite (DVB-S), DVB-Handheld (DVB-H), DVB-Convergence of Broadcasting and Mobile Services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 311 can be configured to be suitable for other broadcasting systems as well as the above-noted digital broadcasting systems. The broadcast signal and/or broadcast associated information received by the broadcast receiving module 311 may be stored in a suitable device, such as the memory 360.

The mobile communication module 312 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 313 supports Internet access for the mobile terminal 300. This module may be internally or externally coupled to the mobile terminal 300. The wireless Internet technology can include WLAN (Wireless LAN) (Wi-Fi), Wibro (Wireless broadband), Wimax (World Interoperability for Microwave Access), or HSDPA (High Speed Downlink Packet Access.)

The short-range communication module 314 facilitates relatively short-range communications. Suitable technologies for implementing this module include RFID, IrDA, UWB, Bluetooth™, RS-232, RS-485, ZigBee™, and the like.

The position-location module 315 identifies or otherwise obtains the location of the mobile terminal 100. According to one embodiment, this module may be implemented with a global positioning system (GPS) module. The GPS module 315 can precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and one or more time information are then amended (or corrected) using another satellite. In addition, the GPS module 315 can calculate speed information by continuously calculating a real-time current location.

The A/V input unit 320 is configured to provide audio or video signal input to the mobile terminal 300. As shown, the A/V input unit 320 includes a camera 321 and a microphone 322. The camera 321 receives and processes image frames of still pictures or video, which are obtained by an image sensor in a video call mode or a photographing mode. Furthermore, the processed image frames can be displayed on the display 351. The image frames processed by the camera 321 can be stored in the memory 360 or can be transmitted to an external recipient via the wireless communication unit 310. Optionally, at least two cameras 321 can be provided in the mobile terminal 300 according to the environment of usage. The microphone 322 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 312 in a call mode. The microphone 322 typically includes assorted noise removing algorithms to remove noise generated in the course of receiving the external audio signal.

The user input unit 330 generates input data responsive to user manipulation of an associated input device or devices. Examples of such devices include a keypad, a dome switch, a touchpad (e.g., static pressure/capacitance), a jog wheel, and a jog switch.

The sensing unit 340 provides sensing signals for controlling operations of the mobile terminal 300 using status measurements of various aspects of the mobile terminal. For instance, the sensing unit 340 may detect an open/closed status of the mobile terminal 100, the relative positioning of components (e.g., a display and keypad) of the mobile terminal 300, a change of position (or location) of the mobile terminal 300 or a component of the mobile terminal 300, a presence or absence of user contact with the mobile terminal 300, and an orientation or acceleration/deceleration of the mobile terminal 300. As an example, a mobile terminal 300 configured as a slide-type mobile terminal is considered. In this configuration, the sensing unit 340 may sense whether a sliding portion of the mobile terminal is open or closed. According to other examples, the sensing unit 340 senses the presence or absence of power provided by the power supply unit 390, and the presence or absence of a coupling or other connection between the interface unit 370 and an external device. According to one embodiment, the sensing unit 340 can include a proximity sensor 341.

The output unit 350 generates output relevant to the senses of sight, hearing, and touch. Furthermore, the output unit 350 includes the display 351, an audio output module 352, an alarm unit 353, a haptic module 354, and a projector module 355.

The display 351 is typically implemented to visually display (output) information associated with the mobile terminal 300. For instance, if the mobile terminal is operating in a phone call mode, the display will generally provide a UI or GUI which includes information associated with placing, conducting, and terminating a phone call. As another example, if the mobile terminal 300 is in a video call mode or a photographing mode, the display 351 may additionally or alternatively display images which are associated with these modes, the UI or the GUI. The display module 351 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 300 may include one or more of such displays. Some of the displays can be implemented in a transparent or optical transmittive type, i.e., a transparent display. A representative example of the transparent display is the TOLED (transparent OLED). A rear configuration of the display 351 can be implemented as the optical transmittive type as well. In this configuration, a user can see an object located at the rear of a terminal body on a portion of the display 351 of the terminal body. At least two displays 351 can be provided in the mobile terminal 300 in accordance with one embodiment of the mobile terminal 300. For instance, a plurality of displays can be arranged to be spaced apart from each other or to form a single body on a single face of the mobile terminal 300. Alternatively, a plurality of displays can be arranged on different faces of the mobile terminal 300. If the display 351 and a sensor for detecting a touch action (hereinafter called 'touch sensor') are configured as a mutual layer structure (hereinafter called 'touch screen'), the display 351 is usable as an input device as well as an output device. In this case, the touch sensor can be configured as a touch film, a touch sheet, or a touchpad. The touch sensor can be configured to convert pressure applied to a specific portion of the display 351 or a variation of capacitance generated from a specific portion of the display 351 to an electronic input signal. Moreover, the touch sensor is configurable to detect pressure of a touch as well as a touched position or size. If a touch input is made to the touch sensor, a signal(s) corresponding to the touch input is transferred to a touch controller. The touch controller processes the signal(s) and then transfers the processed signal(s) to the controller 380. Therefore, the controller 380 is made aware when a prescribed portion of the display 351 is touched. A proximity sensor 341 can be provided at an internal area of the mobile terminal 300 enclosed by the touch screen or around the touch screen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 341 is more durable than a contact type sensor and also has utility broader than the contact type sensor. The proximity sensor 341 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) can be considered as the proximity sensor. For clarity and convenience of explanation, an action for enabling the pointer approaching the touch screen to be recognized as placed on the touch screen may be named 'proximity touch' and an action of enabling the pointer to actually come into contact with the touch screen may named 'contact touch'. And, a position, at which the proximity touch is made to the touch screen using the pointer, may mean a position of the pointer vertically corresponding to the touch screen when the pointer makes the proximity touch. The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 352 functions in various modes including a call-receiving mode, a call-placing mode, a recording mode, a voice recognition mode, and a broadcast reception mode to output audio data which is received from the wireless communication unit 310 or is stored in the memory 360. During operation, the audio output module 352 outputs audio relating to a particular function (e.g., call received, message received). The audio output module 352 may be implemented using one or more speakers, buzzers, other audio producing devices, and combinations of these devices.

The alarm unit 353 outputs a signal for announcing the occurrence of a particular event associated with the mobile terminal 300. Typical events include a call received, a message received and a touch input received. The alarm unit 353 can output a signal for announcing the event occurrence by way of vibration as well as video or audio signal. The video or audio signal can be output via the display 351 or the audio output module 352. Hence, the display 351 or the audio output module 352 can be regarded as a part of the alarm unit 353.

The haptic module 354 generates various tactile effects that can be sensed by a user. Vibration is a representative one of the tactile effects generated by the haptic module 354. The strength and pattern of the vibration generated by the haptic module 354 are controllable. For instance, different vibrations can be output by being synthesized together or can be output in sequence. The haptic module 354 can generate various tactile effects as well as the vibration. For instance, the haptic module 354 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device. The haptic module 354 can be implemented to enable a user to sense the tactile effect through a muscle sense of a finger or an arm as well as to transfer the tactile effect through direct contact. Optionally, at least two haptic modules 354 can be provided in the mobile terminal 300 in accordance with an embodiment of the mobile terminal 300.

The memory 360 is generally used to store various types of data to support the processing, control, and storage requirements of the mobile terminal 300. Examples of such data include program instructions for applications operating on the mobile terminal 300, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 360. Moreover, data for various patterns of vibration and/or sound output in response to a touch input to the touch screen can be stored in the memory 360.

The interface unit 370 may be implemented to couple the mobile terminal 100 with external devices. The interface unit 370 receives data from the external devices or is supplied with power and then transfers the data or power to the respective elements of the mobile terminal 300 or enables data within the mobile terminal 300 to be transferred to the external devices. The interface unit 370 may be configured using a wired/wireless headset port, an external charger port, a wired/wireless data port, a memory card port, a port for coupling to a device having an identity module, audio input/output ports, video input/output ports, and/or an earphone port. The identity module is a chip for storing various kinds of information for authenticating a usage authority of the mobile terminal 300 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectable to the mobile terminal 300 via the corresponding port. When the mobile terminal 300 is connected to an external cradle, the interface unit 370 becomes a passage for supplying the mobile terminal 300 with a power from the cradle or a passage for delivering various command signals input from the cradle by a user to the mobile terminal 300. Each of the various command signals input from the cradle or the power can operate as a signal enabling the mobile terminal 300 to recognize that it is correctly loaded in the cradle.

The controller 380 typically controls the overall operations of the mobile terminal 300. For example, the controller 380 performs the control and processing associated with voice calls, data communications, and video calls. The controller 380 may include a multimedia module 381 that provides multimedia playback. The multimedia module 381 may be configured as part of the controller 380, or implemented as a separate component. Moreover, the controller 380 can perform a pattern (or image) recognizing process for recognizing a writing input and a picture drawing input performed on the touch screen as characters or images, respectively.

The power supply unit 390 provides power required by various components of the mobile terminal 300. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180. For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 380.

Figure 4:
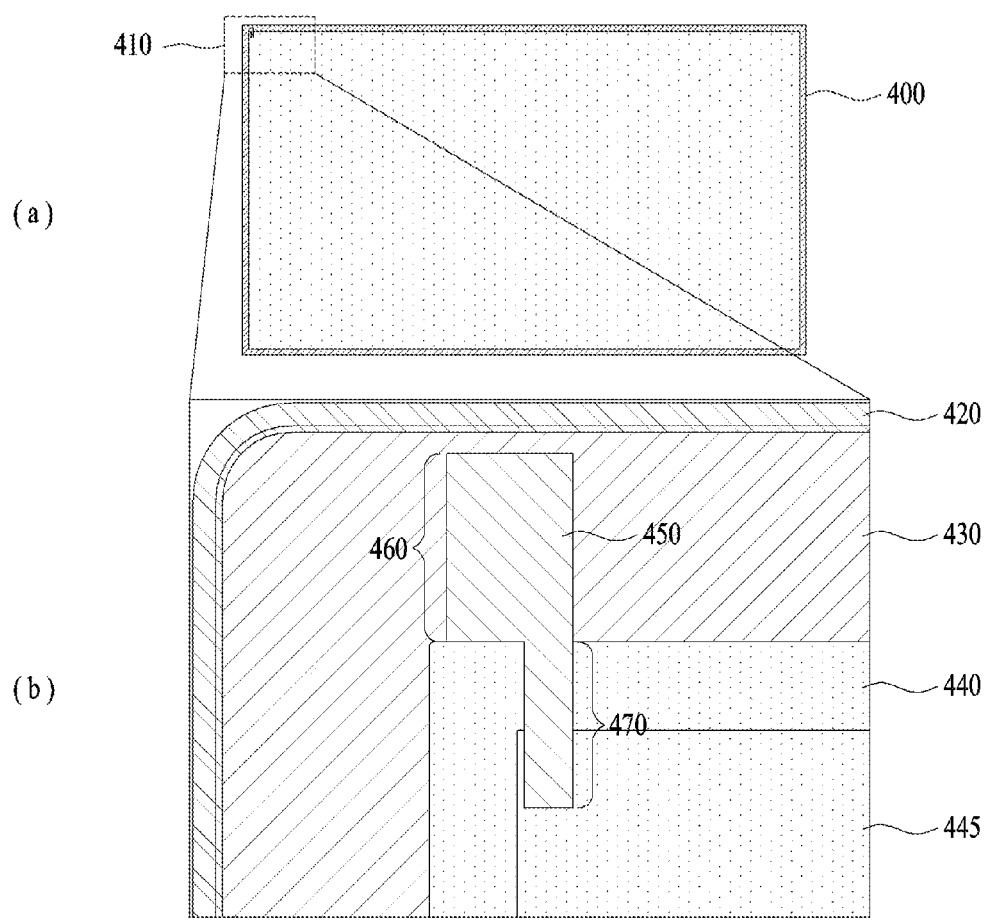
FIG. 4 illustrates a display device having an RGB sensor attached thereto according to an exemplary embodiment of the present invention.

FIG. 4 illustrates a display device having an RGB sensor attached thereto according to an exemplary embodiment of the present invention.

The present invention relates to performing self-diagnosis on the presence or absence of a breakdown (or failure) in a specific equipment, product, and so on, the quality of such equipment, product, and so on, by using a sensor. Herein, although the RGB sensor will be described as an exemplary embodiment of the sensor, the sensor will not be limited only to this.

FIG. 4a illustrates a front view of a display device (400) having an RGB sensor attached thereto according to an exemplary embodiment of the present invention, and FIG. 4b most particularly illustrates an enlarged view of a part (410) where the RGB sensor is attached in FIG. 4a.

Referring to FIG. 4a, the RGB sensor (410) is attached to an upper left side area of the display device (400).

Hereinafter, the display device being equipped with an RGB sensor will hereinafter be described in detail with reference to FIG. 4b.

The display device (400) is equipped with a middle cabinet (420) being provided on an outermost edge, a module top case (430) being provided inside the middle cabinet (420), and a screen (440) being provided inside the module case top (430). The screen (440) includes an active area (445), wherein actual data are outputted. In some cases, the active area (445) may also be formed to have a same size as the screen (440).

Meanwhile, the sensor unit (450) according to the present invention is configured of a first supporting unit (460) and an RGB sensor unit (470). The first supporting unit (460) is either formed on the display device (400) or formed by being coupled with a portion of the display device (400), so as to support the RGB sensor unit (470). Although the first supporting unit (460) is illustrated to have a rectangular form in FIG. 4b, the first supporting unit (460) will not be limited only to this, and, therefore, the first supporting unit (460) may also be configured to have a circular shape, a triangular shape, a lozenge (or diamond) shape, and so on. Meanwhile, the first supporting unit (460) is attached to the module case top (430) of the display device (400). In FIG. 4b, although it is shown that the entire first supporting unit (460) is attached to the module case top (430), the first supporting unit (460) will not be limited only to this, and, therefore, the first supporting unit (460) may be realized in another shape or form in order to support the RGB sensor unit (470). Furthermore, each of the module case top (430), the screen (440), and/or the active area (445) may have a different height. For example, the screen (440) and/or the active area (445) may have a height that is lower than that of the module case top (430). Based upon such height structure of the display device and the height of the RGB sensor, the attachment position, structure, and so on of the sensor unit (450) or the first supporting unit (460) may be diversely varied. This is because it is preferable that the RGB sensor comes in contact with the active area (445) or that the RGB sensor does not come in contact with the active area (445) by being spaced apart to a predetermined distance.

The RGB sensor unit (470) may be further divided into a second supporting unit and an RGB sensor. The second supporting unit fixes (or secures) the attached RGB sensor. One or more of the RGB sensors may be attached to the second supporting unit, and it is preferable that the RGB sensor(s) is (or are) attached to a position corresponding to the active area (445), wherein the actual data are outputted. More specifically, referring to FIG. 4b, it may be known that the RGB sensor unit (470) is realized to have a shape or form extending from the first supporting unit (460) through the screen (440) to an area overlapping with a portion of the active area (445). In the above-described structure, most particularly, it is preferable that, among the RGB sensor unit (470), the RGB sensor is located only in an area overlapping with the active area (445). This is because RGB sensing data sensed through the RGB sensor are acquired from the active area (445). However, the present invention will not be limited only to this.

Meanwhile, in this disclosure, although the sensor unit (450) is described as being divided into the first supporting unit (460) and the RGB sensor unit (470) for simplicity in the description, it may also be sufficient to configure the first supporting unit and the RGB sensor unit as a single body and to only configure the RGB sensor to be located in an area of the sensor unit, i.e., a position corresponding to the active area (445).

In the above-described structure, although it is shown that a width (or breadth) of the RGB sensor unit (470) is smaller than the width of the first supporting unit (460), the present invention will not be limited only to this.

FIG. 5 illustrates an RGB sensor unit that is realized according to an exemplary embodiment of the present invention. For example, a dotted line, shown in FIG. 5, indicates a borderline of the active area.

FIG. 5a is similar to the structure of the above-described sensor unit (450) shown in FIG. 4b. For example, the first supporting unit (510) has a wider width that an RGB sensor unit, and the RGB sensor (530) is attached to the second supporting unit (520), and, herein, the attached position is within the active area.

Unlike FIG. 5a, which is described above, FIG. 5b and FIG. 5c respectively illustrate examples wherein the first supporting unit (540, 570) and the second supporting unit (550, 580) are realized to have the same width.

First of all, referring to FIG. 5b, unlike in FIG. 5a, the RGB sensor (560) is located at a center of the second supporting unit (550). However, even if the RGB sensor (560) is located at the center of the second supporting unit (550), it is preferable that the position of the RGB sensor (560) is within a position corresponding to the active area of the screen. In the above-described FIG. 5a, the RGB sensor (530) is located at a lower right side portion within the second supporting unit (520).

Figure 8:
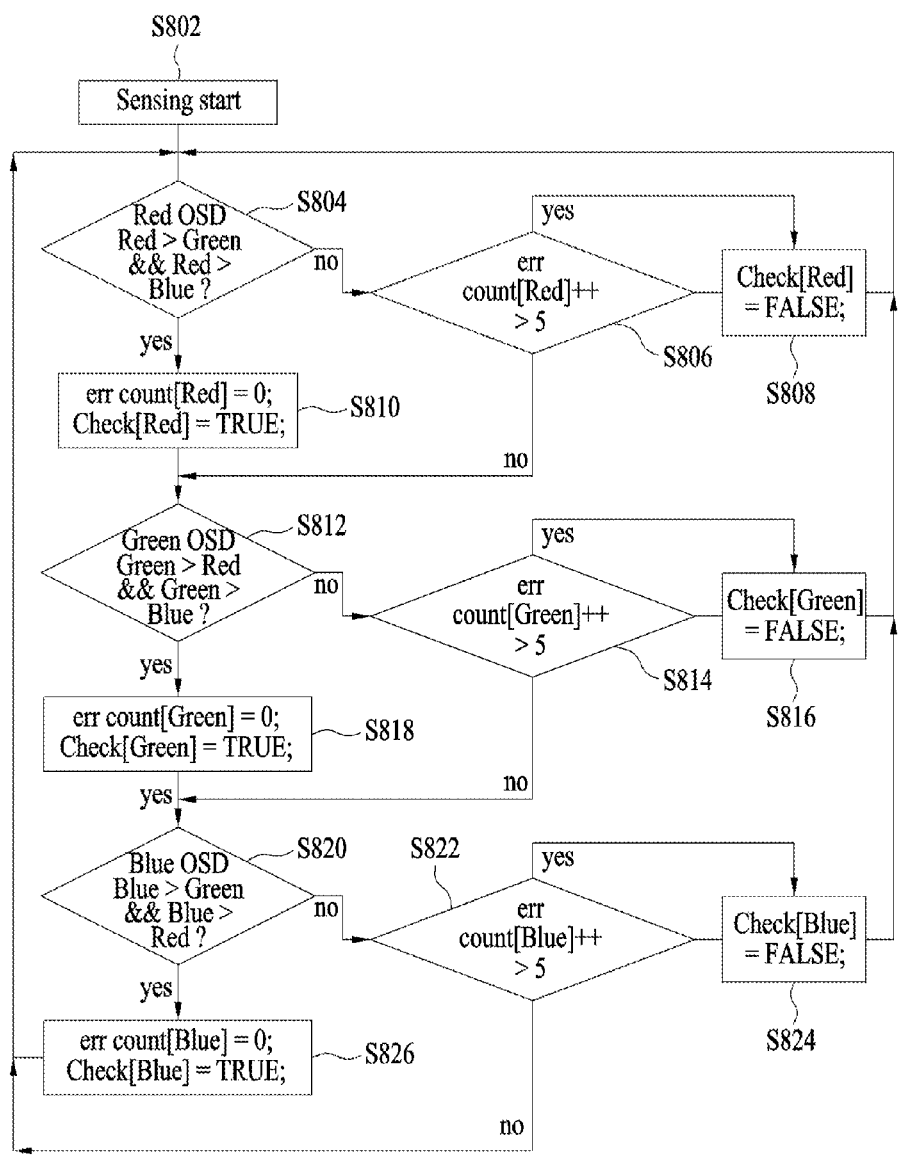
FIG. 8 illustrates a flow chart showing a self-diagnosis algorithm according to an exemplary embodiment of the present invention.
Figure 10:
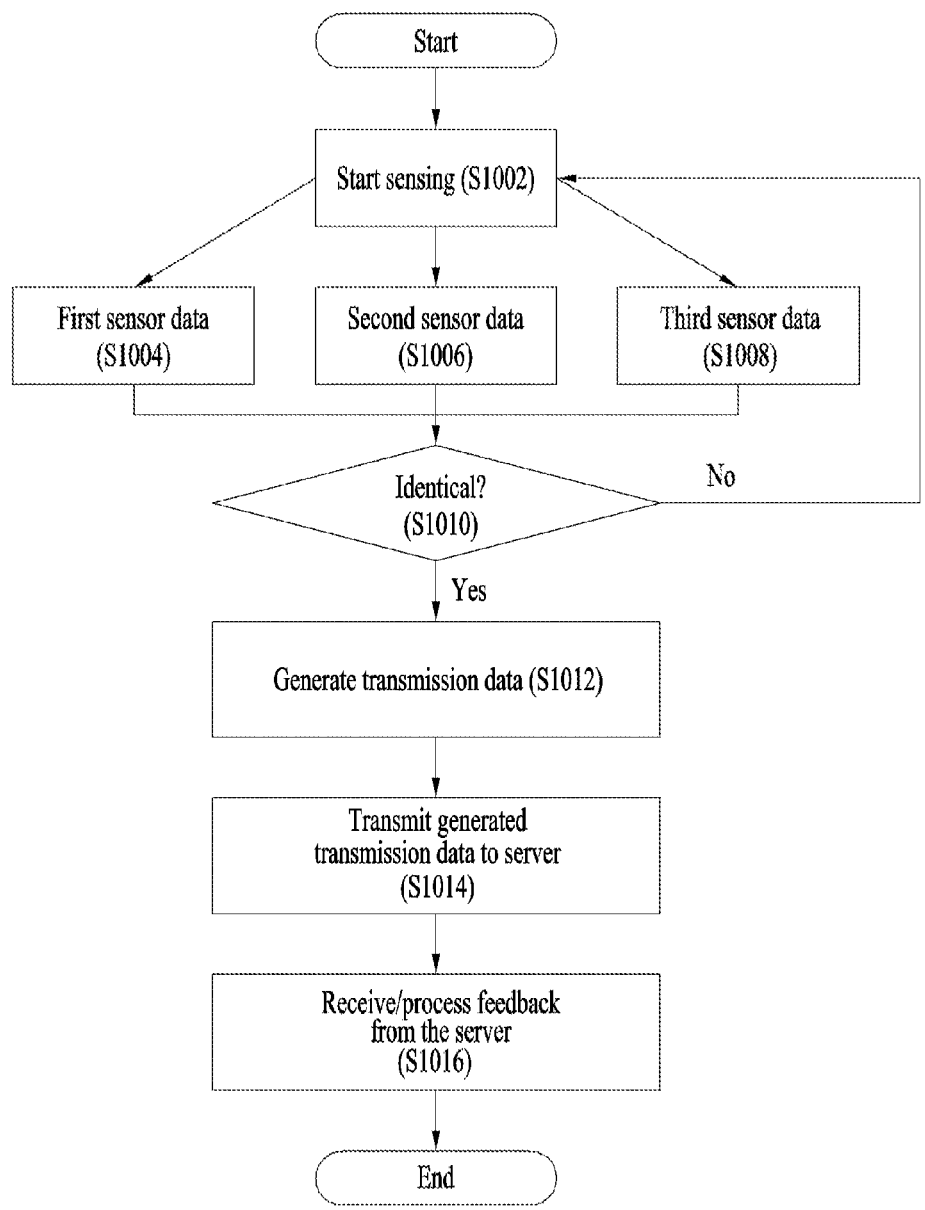
FIG. 10 illustrates a flow chart showing a self-diagnosis algorithm according to another exemplary embodiment of the present invention.

Meanwhile, in FIG. 5c, unlike in the above-described FIG. 4, FIG. 5a, and FIG. 5b, an exemplary embodiment being equipped with a plurality of RGB sensors (592, 594, 596) is illustrated. As shown in FIG. 5c, if a plurality of RGB sensors (592, 594, 596) is provided on the second supporting unit (580), even if a breakdown (or failure) or error occurs in a specific RGB sensor itself, or even if an error occurs in a value that is measured by a specific RGB sensor, accuracy in the screen self-diagnosis performed through the RGB sensor may be enhanced. For example, in case the sensing values of each RFB sensor are different from one another, such values may be processed as shown in FIG. 8 or FIG. 10, which will be described in detail later on.

Figure 6:
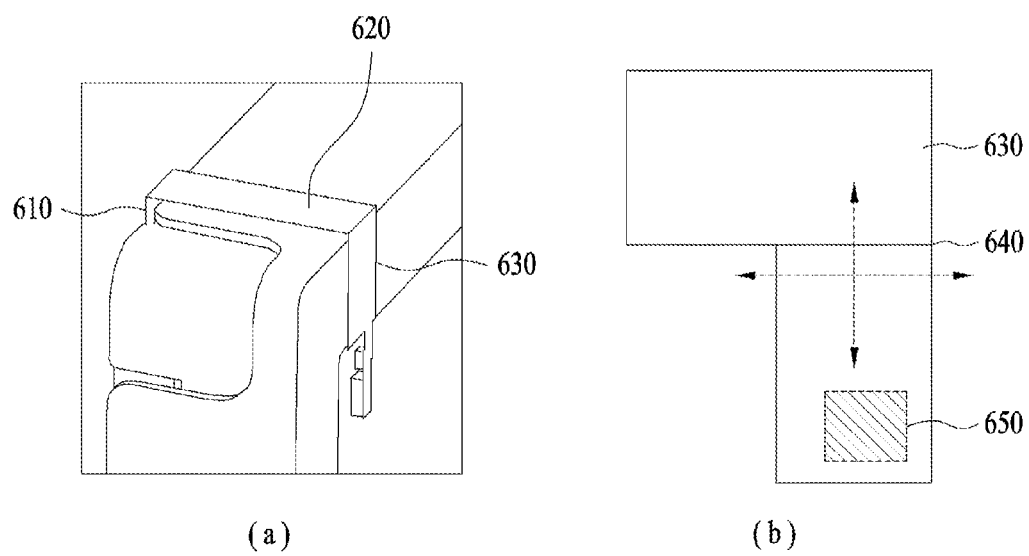
FIG. 6 illustrates a perspective view of an area including a sensor unit in the display device of FIG. 4 and FIG. 5, the area being enlarged more than its actual size and realized in 3D.

FIG. 6 illustrates a perspective view of an area including a sensor unit in the display device of FIG. 4 and FIG. 5, the area being enlarged more than its actual size and realized in 3D.

In the above-described FIG. 4 to FIG. 5, for example, the sensor unit has been described to be merely attached to the module case top (430) of the display device to have a flat surface structure.

Referring to FIG. 6, the supporting unit has one or more curvatures along the display device, and the supporting unit may be configured to be joined (or coupled) to an area of a rear surface of the display device through such curvatures. As described above, such structure is configured to fix (or secure) the sensor unit to the display device, which may fix the sensor unit more securely and firmly as compared to the method of attaching the sensor unit to the module case top (430) so as to have a flat surface structure.

Referring to FIG. 6a, the supporting unit, which is formed along the display device, is configured of supporting unit A (610), supporting unit B (620), and supporting unit C (630). Such structure of the supporting unit may be realized in various forms or shapes in accordance with the display device. Therefore, the present invention will not be limited to the shape or form shown in FIG. 6a.

Herein, the supporting unit A (610) may include a fastening configuration for attaching or securing to the rear surface of the display device.

The supporting unit B (620) corresponds to an upper surface of the display device.

Meanwhile, the supporting unit C (630) corresponds to a front surface of the display device, which is the same as the supporting unit of FIGS. 4 to 5.

However, the above-described supporting unit A (610), supporting unit B (620), and supporting unit C (630) have been arbitrarily differentiated from one another merely for simplicity in the description, and, although each supporting unit corresponds to a different surface, the plurality of supporting units may collectively embody a single configuration.

In FIG. 6b, only the supporting unit C (630) and the RGB sensor (650) are illustrated. Herein, a joint part (640) where one end of the supporting unit C (630) is connected to the RGB sensor (650) may exist. Such joint part (640) may provide support so that a portion including the RGB sensor (650) can form a detachable structure with the supporting unit C (630). Additionally, for example, the joint part (640) may also be realized in a hinge form. Meanwhile, the RGB sensor (650) may arbitrarily change (or vary) or adjust its joining position along vertical/horizontal directions with respect to the supporting unit C (630). Furthermore, the joint part (640) may further include a means that is required for allowing the RGB sensor (650) to be properly fixed to the supporting unit C (630).

Figure 7:
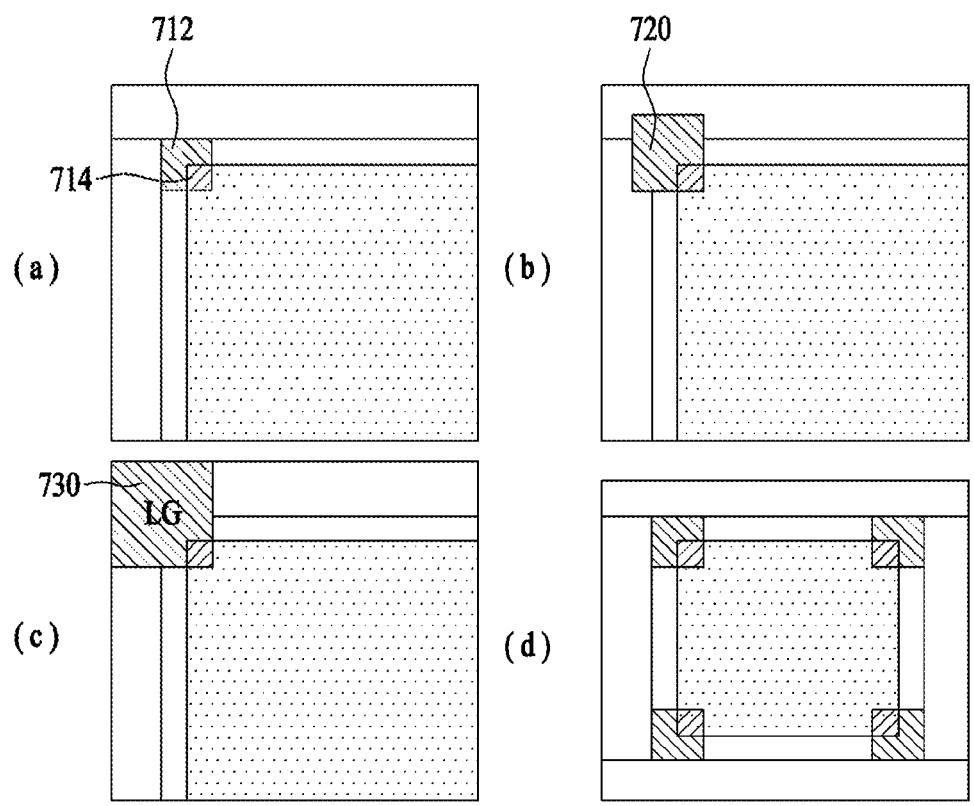
FIG. 7 illustrates a sensor unit being attached to the display device according to an exemplary embodiment of the present invention.

FIG. 7 illustrates a sensor unit being attached to the display device according to an exemplary embodiment of the present invention. Herein, reference will be made to the above-described drawing and description of the RGB sensor unit, and, therefore, a detailed description of the same will be omitted for simplicity in the description, and the sensor unit will be illustrated in a more simplified version.

Referring to FIG. 7a, unlike in the above-described FIGS. 4 to 6, the supporting unit (712) exists only in a screen area of the display device. At this point, even within the supporting unit (712) the RGB sensor exists only in an area (714) overlapping with the active area More specifically, instead of being attached to the module case top, the supporting unit (712) may be realized to extend from one end of the module case top. Such structure of FIG. 7a may correspond to a structure that is embodied in advance at the time of the fabrication of the display device.

Although FIG. 7b is similar to the above-described FIG. 7a, instead of having the supporting unit (712) extended from one end of the module case top, as shown in FIG. 7a, the supporting unit is embodied to have a structure contacting an area of the module case top.

Additionally, FIG. 7c illustrates an embodiment of the supporting unit (730) being further extended than the structure shown in FIG. 7b, so that each end of the supporting unit meets with each end of the module case top. In this case, the width of the supporting unit may be decided in accordance with the width of the module case top of the display device. As described above, in case the width of the supporting unit (730) is extended, for example, a logo of the manufacturer (ex, LG) may be included. This may be equally applied to each exemplary embodiment of FIG. 7.

Meanwhile, as described above, FIG. 7d shows an example wherein the sensor unit can be located not only in the upper left end of the display device but also in a lower left end, an upper right end, and a lower right end of the display device. Moreover, a plurality of sensor units may exist within the display device, and each sensor unit may be adequately allocated to predetermined areas shown in FIG. 7d. Furthermore, for example, each sensor unit of FIG. 7d may be realized to have any one of the structures shown in FIGS. 7a to 7c.

In FIGS. 4 to 7, in addition to the function of merely supporting the RGB sensor, the supporting unit also performs a function of blocking ambient light (or external light) in order to increase accuracy of sensing data sensed through the RGB sensor and to prevent error from occurring. Accordingly, the width or breadth of the above-described sensor unit may be realized to be greater than the description and illustration provided above.

FIG. 8 illustrates a flow chart showing a self-diagnosis algorithm according to an exemplary embodiment of the present invention, and FIG. 9 illustrates definitions of data being transmitted/received during the self-diagnosis procedure.

An exemplary embodiment of a self-diagnosis algorithm according to the present invention corresponds to an algorithm for remotely performing self-diagnosis on any defect in a panel or Low Voltage Differential Signaling (LVDS) cable and for processing the self-diagnosis, in order to resolve problems respective to an interruption in the playback or output of advertisement or content by immediately responding to the occurrence of such defect. In the related art, in case of any panel failure (or breakdown) or LVDS cable defect, additional equipments or hardware detection devices, such as cameras, have been used, whereas, in the present invention, self-diagnosis is performed via RGB color comparison by using the software coding method.

a method of self-diagnosing a display device includes outputting content of a screen, outputting On Screen Display (OSD) data respective to each color of RGB to the screen having the content outputted thereto, transmitting a sensing command directing an initiation of self-diagnosis to a sensor attached to an area of the display device; acquiring sensing data respective to each color in accordance with the sensing command transmission from the sensor, comparing the acquired sensing data respective to each color with the outputted OSD data respective to each color, and generating self-diagnosis result data respective to the screen based upon the compared result and transmitting the generated data to a server.

As described above, in the display device, a sensor unit including at least one RGB sensor is attached to an area of the display device.

The display device may store and output RGB OSD (On Screen Display) data through firmware. Meanwhile, the attached RGB sensor measures Red, Green, and Blue values, and the display device may perform a comparison between the measured RGB values and the RGB OSD data, which are stored and outputted through the firmware, thereby being capable of determining whether or not a defect or problem exists in the screen.

The RGB sensor senses RGB values respective to the screen of the display device either periodically or aperiodically. The RGB sensor may notify in advance to the display device of the RGB sensing for performing the self-diagnosis, and, conversely, the display device may request and/or direct or notify in advance to the RGB sensor to perform sensing for the self-diagnosis. As described above, the display device may directly determine and carry out the request or direction related to the self-diagnosis, or the display device may carry out the process in accordance with the request or direction given by the server or user equipment. With respect to the notification, as shown in FIG. 9, the RGB sensor may transmit data ('0x10') configured to signify a check screen for self-diagnosis to the display device.

The RGB sensor senses RGB values respective to OSD data, which are outputted from the display device (S802). By receiving the OSD RGB values, which are sensed with respect to the OSD data being outputted from the RGB sensor, and by checking for the presence or absence of any errors in comparison to the RGB values of the outputted OSD, the display device may perform a simple self-diagnosis by only using the software coding method.

In case a Red OSD appears on the screen, the display device determines whether or not the Red value, which is sensed by the RGB sensor, is greater than the Green value and/or Blue value of the outputted OSD intended by the display device (S804).

Based upon the determined result of step S804, if the Red value sensed with respect to the Red OSD data is equal to or less than at least one of the Green value and the Blue value, it will be determined that an error count respective to the Red value exceeds a predetermined value (threshold value, T1) (S806).

Based upon the determined result of step S806, if the error count respective to the Red value does not exceed predetermined value (T1), the procedure moves on to step S812. However, based upon the determined result of step S806, if the error count respective to the Red value exceeds the predetermined value (T1), the Red check result is determined as False (S808). If the Red check result is determined to be False, the display device may report this result to itself or to the server, and, then, the display device may control the RGB sensor, so that the RGB sensor can sense the Red OSD data once again in accordance with the directions given by the server, and so on. However, in step S808, if the Red value is determined to be False, the entire self-diagnosis procedure may be put on holding, or the self-diagnosis procedure may be continued with respect to the other colors.

Based upon the determined result of step S804, if the Red value sensed with respect to the Red OSD data is determined to be greater than the Green value and the Blue value, based upon the determined result with respect to the color Red, the Red value will be recorded to be True (S810). In this case, in some cases, an error count predetermined (or pre-configured) with respect to the Red value may be initialized.

Thereafter, the display device repeats the above-described procedure performed on the color Red with respect to the color Green or the color Blue. Referring to FIG. 8, an example of performing self-diagnosis on the color Green firsthand will be given herein. However, as shown in FIG. 8, although the present invention may perform sensing by the order of RGB and then perform self-diagnosis, the order of color or determination may be arbitrary. In other words, the present invention will not be limited to the color order for self-diagnosis, and the order may vary each time the self-diagnosis is performed.

In case a Green OSD appears on the screen, the display device receives a Green value, which is sensed by the RGB sensor, and determines whether or not the Green value is greater than the Red value and/or Blue value of the outputted OSD intended by the display device (S812).

Based upon the determined result of step S812, if the Green value sensed from the Green OSD data is equal to or less than at least one of the Red value and the Blue value, it will be determined that an error count respective to the Green value exceeds a predetermined value (T2) (S814). Herein, for example, the predetermined value (T2) may or may not be equal to the above-described predetermined value (T1) respective to the error count of the Red value.

Based upon the determined result of step S814, if the error count respective to the Green value does not exceed the predetermined value (T2), the procedure moves on to step S820. However, based upon the determined result of step S814, if the error count respective to the Green value exceeds the predetermined value (T2), the Green check result is determined as False (S816). If the Green check result is determined to be False, the display device may report this result to itself or to the server, and, then, the display device may control the RGB sensor, so that the RGB sensor can sense the Green OSD data once again in accordance with the directions given by the server, and so on. At this point, the display device may also perform control operations so that the self-diagnosis procedure can start back from its beginning, i.e., starting from Red.

Based upon the determined result of step S812, if the Green value sensed with respect to the Green OSD data is determined to be greater than the Red value and the Blue value, based upon the determined result with respect to the color Green, the Green value will be recorded to be True (S818). In this case, in some cases, an error count predetermined (or pre-configured) with respect to the Green value may be initialized.

Finally, the self-diagnosis respective to the color Blue is performed.

In case a Blue OSD appears on the screen, the display device receives a Blue value, which is sensed by the RGB sensor, and determines whether or not the Blue value is greater than the Red value and/or Green value of the outputted OSD intended by the display device (S820).

Based upon the determined result of step S820, if the Blue value sensed from the Blue OSD data is equal to or less than at least one of the Red value and the Green value, it will be determined that an error count respective to the Blue value exceeds a predetermined value (T3) (S822). Herein, for example, the predetermined value (T3) may or may not be equal to at least one of the above-described T1 and T2.

Based upon the determined result of step S822, if the error count respective to the Blue value does not exceed the predetermined value (T3), the self-diagnosis procedure is completed, and then the process step returns to the beginning and waits for a next self-diagnosis process. However, based upon the determined result of step S822, if the error count respective to the Blue value exceeds the predetermined value (T3), the Blue check result is determined as False (S824). If the Green check result is determined to be False, the display device may report this result to itself or to the server, and, then, the display device may control the RGB sensor, so that the RGB sensor can sense the Blue OSD once again in accordance with the directions given by the server, and so on. At this point, the display device may also perform control operations so that the self-diagnosis procedure can start back from Green or Red instead of Blue.

Based upon the determined result of step S820, if the Blue value sensed with respect to the Blue OSD is determined to be greater than the Red value and the Green value, based upon the determined result with respect to the color Blue, the predetermined error count is initialized, and the Blue value will be recorded to be True (S826).

Meanwhile, even if there is an error in the self-diagnosis result respective to any one color among RGB, the display device may determine the next color.

Additionally, the display device may transmit the self-diagnosis result respective to each of the RGB data to the server, or the display device may also collectively transmit the self-diagnosis result on the entire RGB to the server in a single transmission.

Referring to FIG. 9, the self-diagnosis data being transmitted between the server and the display device may be defined as described below.

The self-diagnosis data may be defined as '00', in case Red, Green, and Blue are all False, or the self-diagnosis data may be defined as '01', in case only Red is True and the rest is all False, or the self-diagnosis data may be defined as '02', in case only Green is True and the rest is all False, or the self-diagnosis data may be defined as '03', in case only Blue is True and the rest is all False, or the self-diagnosis data may be defined as '04', in case Red and Green are True and only Blue is False, or the self-diagnosis data may be defined as '05', in case Red and Blue are True and only Green is False, or the self-diagnosis data may be defined as '06', in case only Red is False and Green and Blue are True, or the self-diagnosis data may be defined as '07', in case Red, Green, and Blue are all True. However, the present invention will not be limited to the above-mentioned numbers, and, the data may be defined by using other method. Meanwhile, the display device may transmit the self-diagnosis data corresponding to the self-diagnosis result to the server or the user equipment, or the display device may output the data to the screen.

Meanwhile, the self-diagnosis data values, which are defined as described above, may each be mapped to panel failure, LVDS cable defect, connection defect, contact defect, and so on, and such mapping data may be transmitted along with the above-described data transmission or may be outputted to the screen.

In case the self-diagnosis data value, which is transmitted from the display device, is not equal to '07', the server may direct the display device to perform the self-diagnosis procedure respective to the corresponding color once again or to perform the entire self-diagnosis procedure once again.

FIG. 10 illustrates a flow chart showing a self-diagnosis algorithm according to another exemplary embodiment of the present invention.

For example, FIG. 10 illustrates a self-diagnosis algorithm in case a plurality of RGB sensors exists, as shown in FIG. 5c. Most particularly, in FIG. 10, an exemplary embodiment being equipped with 3 RGB sensors will be described. Meanwhile, each RGB sensor may be allocated specifically for R (R-specific), specifically for G (G-specific), specifically for B (B-specific), and each RGB sensor may also be allocated to perform sensing with respect to all of the colors RGB. However, for simplicity in the description, in FIG. 10 the latter will be given as an example and be described accordingly.

At this point, in FIG. 10, the procedure of collecting sensing data of each sensor may be realized as described in FIG. 8.

When sensing is initiated by the RGB sensor (S1002), the display device receives first sensing data (S1004), second sensing data (S1006), and third sensing data (S1008) from each sensor.

Based upon each set of the received sensing data, the display device performs a comparison procedure for transmission data generation, as shown in FIG. 9. More specifically, the display device determines whether or not each set of the received data is identical to one another (S1010).

Based upon the compared result of S1010, if each set of the received sensing data is identical to one another, based upon this, transmission data are generated (S1012), as shown in FIG. 9, and the generated transmission data are transmitted to the server (S1014). Subsequently, in accordance with the transmission of S1014, the display device receives a feedback from the server and then performs processing in accordance with the received feedback (S1016). Meanwhile, as described above, in case all sets of sensing data are identical to one another, this may also include a case when a difference between each set of sensing data is within a predetermined range.

Nevertheless, based upon the determined result of S1010, if none the received sets of sensing data is identical to one another, the processing may become a problem.

The problem may be processed by using diverse methods, and, first of all, based upon the determined result of S1010, if none the received sets of sensing data is identical to one another, a command to perform re-sensing is ordered to all sensors.

Based upon the compared result of S1010, if none the received sets of sensing data is identical to one another, the comparison is distinctively carried out in sensor units, color units, and so on, and, based upon such distinctive comparison, the display device may request for re-sensing, and so on, with respect to the corresponding sensor, the corresponding color, and so on.

Among the three RGB sensors, if the sensing data values of two RGB sensors are identical to one another, and if the sensing data value of the remaining RGB sensor is different, a re-sensing command may be ordered to all sensors or to the corresponding sensor.

Among the three RGB sensors, if the sensing data values of two RGB sensors are identical to one another, and if the sensing data value of the remaining RGB sensor is different, the corresponding sensor compares its data with the data of the other sensors in color units. Based upon the compared result, in case of the color unit, the re-sensing command may be made only one the color that is different from the sensing data of the other sensors.

Alternatively, a comparison between the sensing data of each sensor is carried out in color units from the beginning. Based upon the compared result, with respect to the color that does not match (or that is not identical) in the sensing data of each sensor, the re-sensing command may be made to all sensors or only to the corresponding sensor.

FIG. 11 illustrates a network environment for data communication between a display device and a server according to an exemplary embodiment of the present invention.

For example, the server (1120) and the display device (1110) may be in a server-client relationship. At this point, the client, i.e., the display device (1110) may correspond to one or more display devices.

Such client-server may perform data communication between one another through a network, as shown in FIGS. 11a to 11b. In case of FIG. 11a, two communication protocols may exist, such as a first communication protocol transmitting video data and a second communication protocol transmitting the remaining types of data may exist. Herein, the first communication protocol may include TCP/IP, wired cable, Wi-fi, LTE network, and so on. Additionally, the second communication protocol corresponds to a protocol for transmitting data, such as text, and so on, other than the audio/video data, and, herein, a RS232 protocol or a TCP/IP protocol may be used. In relation to the present invention, the self-diagnosis data may be transmitted/received between the server (1120) and the display device (1110) through at least one of the first communication protocol and the second communication protocol. Meanwhile, the first communication protocol and the second communication protocol may or may not be identical to one another, and this may be diversely varied depending upon the network condition.

Unlike the above-described FIG. 11a, in case of FIG. 11b, a media player (1130) for audio/video playback and a network (1140) exist between the server (1120) and the display device (1110).

If FIG. 11a is given as an example of a display device including a configuration block that can decode and process audio/video on its own, FIG. 11b may correspond to a digital signage, such as a monitor, merely configured to output decoded data. Accordingly, the digital signage may be equipped with a media player (1130) decoding media data, i.e., audio/video data. At this point, as described above in FIG. 11a, multiple communication protocols may be required between the digital signage (1110) and the media player (1130). Additionally, a TCP/IP communication protocol may be used between the media player (1130) and the network (1140).

Figure 12:
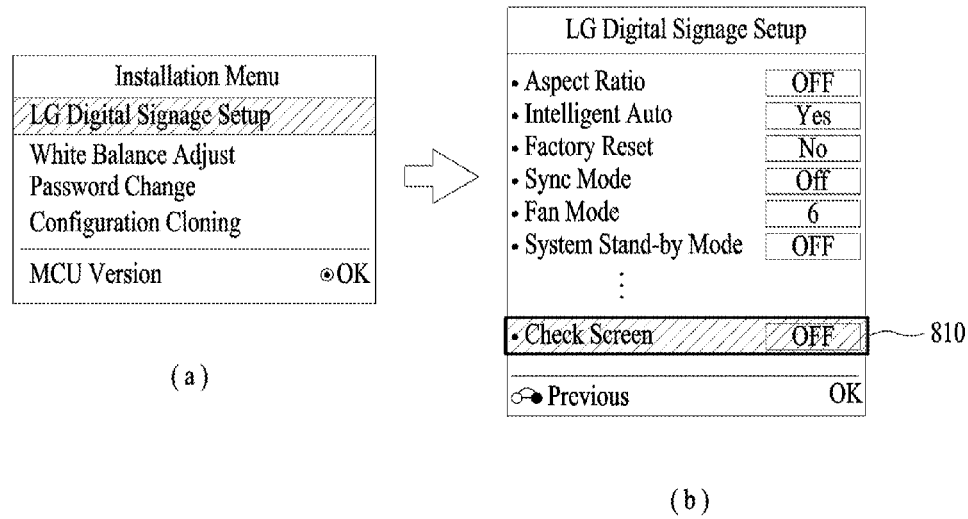
FIG. 12 illustrates a user interface for self-diagnosis configuration according to an exemplary embodiment of the present invention.

FIG. 12 illustrates a user interface for configuring self-diagnosis settings according to an exemplary embodiment of the present invention.

As described above, FIG. 12 illustrates a user interface for having self-diagnosis settings configured by a user in order to perform self-diagnosis on the display device.

For example, FIG. 12a corresponds to an Installation Menu, and, herein, menu options, such as Digital Signage Setup, White Balance Adjust, Password Change, Configuration Cloning, and so on, exist. In FIG. 12a, if the user selects the Digital Signage Setup option, a configuration screen is provided, as shown in FIG. 12b.

In the configuration screen of FIG. 12b, Aspect Ratio, Intelligent Auto, Factory Rest, Sync Mode, Fan Mode, System Stand-by Mode, and Check Screen options exist.

In relation to the present invention, in case self-diagnosis respective to the digital signage is desired, the user is simply required to check the Self-Diagnosis option. When the self-diagnosis is configured (or set-up), as described above, the display device periodically/aperiodically performs self-diagnosis through the RGB sensor(s), and, then, the display device may report the results to the server.

Figure 14:
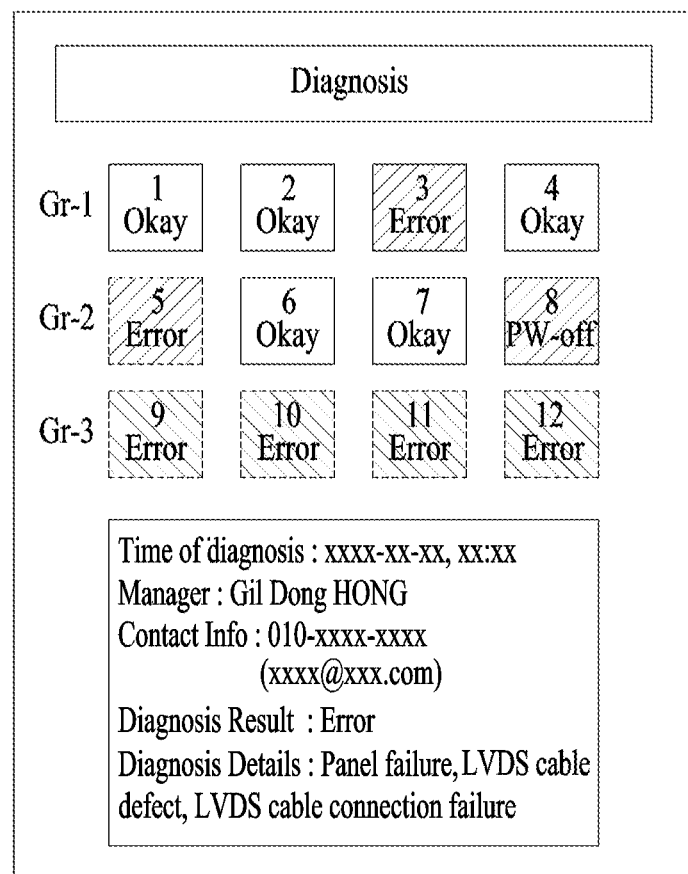
Figure 15:
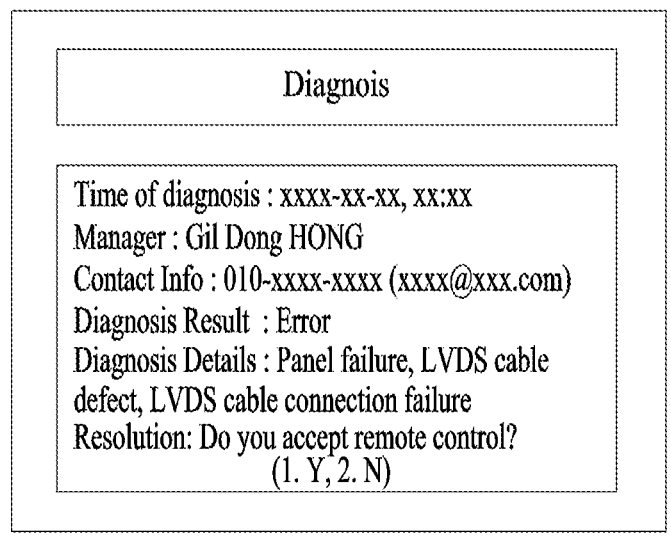

FIG. 13 to FIG. 15 respectively illustrate examples of outputting self-diagnosis results and processing such results according to an exemplary embodiment of the present invention.

FIG. 13 illustrates a diagnosis result (or diagnostics) screen configured according to an exemplary embodiment of the present invention.

Referring to FIG. 13, as the diagnosis result with respect to one display device, Host Information (1310), Memory information (1320), Host Release Version (1330), TV LINK information (1340), Used Time (1350), Fan Status (1360), MAC Address (1370), DVI/HDMI Status information (1380), and so on, are provided. Herein, the self-diagnosis information according to the present invention is included in the Fan Status information (1360) and provided to the Check Screen option (1365).

FIG. 14 illustrates another example of a screen configuration outputting the diagnosis result.

For example, FIG. 13 corresponds to an example for a display device and that diverse detailed information is provided herein, whereas FIG. 14 illustrates a configuration of a diagnosis result screen that can output the diagnosis result to multiple display devices simultaneously or to only one screen. Accordingly, referring to FIG. 14, the operating manager/server may verify information on the multiple display devices being connected to a single server collectively and at the same time, and, then, the operating manager/server may intuitively determine whether or not a problem exists in each of the display devices.

For example, in FIG. 14, it is assumed that, among a total of 12 display devices being connected to the server, it may be known that an error has occurred in the diagnosis result respective to 6 display devices. At this point, the display device having an error occurred therein may be differentiated from a normal device by changing the color, varying the outline, applying high-light, or flickering, and so on, with respect to an option indicating the corresponding device.

Meanwhile, one or more display devices may be grouped, and the operating manager/server may also control the display devices in group units. Referring to FIG. 14, in case of Group 3 (Gr-3), in case an error occurs in at least one of the devices belonging to the corresponding group, all of the devices in the corresponding group may be marked as Error. Although this may be varied depending upon the definition of the groups, in case of grouping the devices in accordance with location, and, in case a problem occurs in at least one of the devices within the group, since a likelihood of an error occurring in another device within the corresponding group is relatively higher as compared to other groups, this is to prevent in advance such error from occurring. Meanwhile, in addition to location, the group may be configured in accordance with diverse reference standards, such as content, and so on.

Meanwhile, in a lower portion of FIG. 14, or in FIG. 15, a detailed diagnosis result is provided, and this may correspond to a detailed diagnosis result respective to the device selected in FIG. 14. Most particularly, in FIG. 15, unlike what is illustrated with respect to the selected device, information shown in FIG. 13 may also be provided. Alternatively, the screen configuration of FIG. 15 may correspond to a screen of a user equipment of the operating manager.

Additionally, unlike what is shown in the drawing, the user interface of FIGS. 12 to 15 may provide the self-diagnosis result data respective to each display device based upon position information (or location information), such as GPS, and voice information may also be provided along with the self-diagnosis result data.

Meanwhile, for example, the user interface and the self-diagnosis result display of FIGS. 12 to 15 may be outputted to the display device, the server, the user equipment of the operating manager, and so on, so as to be provided and configured to the user.

Furthermore, in the present invention, with the exception for a case when content cannot be outputted due to a breakdown (or failure) in the screen, the display device may output the self-diagnosis result along with the content that is currently being provided to a predetermined area overlapping with the current content or to an area that does not overlap with the current content. Additionally, as described above, in case content is already being provided, in order to perform self-diagnosis, RGB OSD data may be arbitrarily provided separately from the content in an area where the RGB sensor is located. Meanwhile, although it is not shown in the drawing, in case a failure occurs in the communication with the user equipment or server due to network conditions, and so on, and in case it is difficult to provide information on the error, and so on, of the corresponding display device, the sensor unit itself may emit light that can be identified from an external environment. Moreover, although the screen and the active area have been differentiated from one another and described accordingly in this disclosure, the active area may also be referred to as a screen, and, therefore, the terms may be alternately used without being strictly differentiated from one another.

According to diverse exemplary embodiments the present invention, a self-diagnosing system that can self-diagnose a presence or absence of any breakdown (or failure) in a display device and a quality of the display device by using an RGB sensor and that can process the self-diagnosis result by communicating with a remote server may be provided, and, by attaching a compact RGB sensor to a predetermined area of the display device, a self-diagnosis on a presence or absence of a panel failure, a cable defect, and so on, may be performed in the display device in comparison to a measured RGB value, and, by allowing monitoring to be performed by the remote server, so that, when an error occurs during playback (or reproduction) of content in the display device, the error may be immediately recognized and processed (or handled), thereby minimizing user inconvenience. Additionally, according to the present invention, not only can a self-diagnosis be performed on a presence or absence of a malfunction (or error) in the panel regardless of a presence or absence of a signal from the display device, but an examination area and an examination location, and so on, for performing the self-diagnosis may also be arbitrarily adjusted by using a software coding method in order to perform self-diagnosis of the display device.

Instead of having the configuration and method of the above-described exemplary embodiments be applied with limitations (or restrictions), the self-diagnosing system and the method of self-diagnosing of a display device, which are disclosed in this disclosure, the exemplary embodiments of the preset invention may also be configured as optional combination of the above-described exemplary embodiments fully or in part.

The method for operating the display device disclosed in this disclosure may be realized as a code that can be read by a processor, which is provided in a network device, in a recording medium that can be read by a processor. The recording medium that can be read by the processor includes all types of recording devices storing data that can be read by the processor. Examples of the recording media that can be read by a processor may include ROM (Read Only Memory), RAM (Random Access Memory), CD-ROM, magnetic tape, floppy disk, optical data storing device, and so on. Also, a recording medium being realized in the form of a carrier-wave, such as a transmission via Internet, may also be included. Also, the recording medium that can be read by a processor may be scattered within a computer system, which is connected through a network. And, a code that can be read by the processor may be stored and executed by using a dispersion (or scattering) method.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of self-diagnosing a display device, the method comprising:
   outputting content of a screen;
   outputting On Screen Display (OSD) data respective to each of RGB colors to the screen displaying the content;
   transmitting a sensing command directing an initiation of self-diagnosis to a sensor attached to an area of the display device;

acquiring sensing data respective to each color in accordance with the sensing command transmission from the sensor;

comparing the acquired sensing data respective to each color with the OSD data; and generating self-diagnosis result data respective to the screen based upon a compared result and transmitting the self-diagnosis result data to a server, wherein the comparing includes:
  determining whether a color data value sensed with respect to one of the RGB colors, when outputting the OSD data respective to each color, is greater than OSD data values respective to other colors among the RGB colors, and
  when the color data value sensed with respect to the one of the RGB colors is greater than the OSD data values respective to the other colors among the RGB colors, resetting an error count respective to the one of the RGB colors and determining the self-diagnosis result to be true.

2. The self-diagnosis method of claim 1, wherein the determining by comparison is realized sequentially in each of the acquired colors units.

3. The self-diagnosis method of claim 2, wherein, based upon the sequential self-diagnosis results respective to each color, the re-sensing is performed with respect to all colors or to any one of the RGB colors.

4. The self-diagnosis method of claim 3, wherein the re-sensing is performed for a predetermined number of times until results respective to all colors are determined to be true, and wherein the self-diagnosis result is transmitted to the server as being false, only when results respective to all colors are not all determined to be true during the predetermined number of times.

5. The self-diagnosis method of claim 1, further comprises:
  based upon the compared result, when the color data value sensed with respect to the one of the RGB colors is equal to or less than the OSD data values respective to other colors, determining whether or not an error count respective to the one of the RGB colors exceeds a predetermined threshold value.

6. The self-diagnosis method of claim 5, wherein, based upon the determined result, when the error count respective to the one of the RGB colors exceeds the predetermined threshold value, a self-diagnosis result respective to one of the RGB colors is determined to be false.

7. The self-diagnosis method of claim 5, wherein, based upon the determined result, when the error count respective to the one of the RGB colors does not exceed the predetermined threshold value, the determining by comparison whether a color data value sensed with respect to a next color is greater than the OSD data values respective to other colors is performed.

8. The self-diagnosis method of claim 1, wherein the generated self-diagnosis data transmit data indicating that the self-diagnosis result is true to the server, only when the self-diagnosis result respective to all colors are determined to be true.

9. A display device performing self-diagnosis by communicating with a server, the display device comprises:
  an outputting unit configured to output content on a screen and On Screen Display (OSD) data respective to each of RGB colors to the screen displaying the content;
  a controlling unit configured to transmit a sensing command directing an initiation of self-diagnosis to a sensor attached to an area of the display device, to acquire sensing data respective to each color in accordance with the sensing command transmission from the sensor, to compare the acquired sensing data respective to each color with the OSD data, and to generate self-diagnosis result data respective to the screen based upon a compared result and transmitting the self-diagnosis result data to a server; and
  a transmitting unit configured to transmit the generated self-diagnosis data in accordance with control of the controlling unit,
  wherein the controlling unit is further configured to:
    determine whether a color data value sensed with respect to one of the RGB colors, when outputting the OSD data respective to each color, is greater than OSD data values respective to other colors among the RGB colors, and
    when the color data value sensed with respect to the one of the RGB colors is greater than the OSD data values respective to the other colors among the RGB colors, reset an error count respective to the one of the RGB colors and determine the self-diagnosis result to be true.

10. The display device of claim 9, wherein the controlling unit sequentially performs determination by comparison in each of the acquired colors units.

11. The display device of claim 10, wherein, based upon the sequential self-diagnosis results respective to each color, the controlling unit performs control operations so as to allow re-sensing to be performed with respect to all colors or to be performed with respect to any one of the RGB colors.

12. The display device of claim 11, wherein the controlling unit performs control operations so as to allow re-sensing to be performed for a predetermined number of times until results respective to all colors are determined to be true, and to allow the self-diagnosis result to be transmitted to the server as being false, only when results respective to all colors are not all determined to be true during the predetermined number of times.

13. The display device of claim 9, wherein, based upon the compared result, when the color data value sensed with respect to the one of the RGB colors is equal to or less than the OSD data values respective to other colors, the controlling unit determines whether or not an error count respective to the one of the RGB colors exceeds a predetermined threshold value.

14. The display device of claim 13, wherein, based upon the determined result, when the error count respective to the one of the RGB colors exceeds the predetermined threshold value, the controlling unit determines a self-diagnosis result respective to the one of the RGB colors to be false.

15. The display device of claim 13, wherein, based upon the determined result, when the error count respective to the one of the RGB colors does not exceed the predetermined threshold value, the controlling unit determines by comparison whether a color data value sensed with respect to a next color is greater than the OSD data values respective to other colors.

16. The display device of claim 9, wherein the controlling unit performs control operations so as to allow the generated self-diagnosis data to transmit data indicating that the self-diagnosis result is true to the server, only when the self-diagnosis result respective to all colors are determined to be true.

* * * * *